(12) United States Patent
Muta et al.

(10) Patent No.: US 9,840,067 B2
(45) Date of Patent: Dec. 12, 2017

(54) HEAT-SHRINKABLE LAMINATED FILM, MOLDED PRODUCT AND HEAT-SHRINKABLE LABEL COMPRISING THE FILM, AND CONTAINER

(75) Inventors: Takatoshi Muta, Shiga (JP); Tomoyuki Nemoto, Shiga (JP); Jun Takagi, Shiga (JP); Kanako Hayashi, Shiga (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 13/881,430

(22) PCT Filed: Nov. 24, 2010

(86) PCT No.: PCT/JP2010/070940
§ 371 (c)(1),
(2), (4) Date: Apr. 25, 2013

(87) PCT Pub. No.: WO2012/070130
PCT Pub. Date: May 31, 2012

(65) Prior Publication Data
US 2013/0224412 A1    Aug. 29, 2013

(51) Int. Cl.
*B32B 1/02*       (2006.01)
*B32B 27/08*    (2006.01)
(Continued)

(52) U.S. Cl.
CPC ............ *B32B 27/08* (2013.01); *B32B 27/302* (2013.01); *B32B 27/36* (2013.01); *B65D 23/0878* (2013.01); *B65D 25/205* (2013.01); B32B 2250/24 (2013.01); B32B 2307/736 (2013.01); *Y10T 428/1352* (2015.01); *Y10T 428/31797* (2015.04)

(58) Field of Classification Search
CPC ......... B32B 27/08; B32B 1/08; B32B 27/302; B32B 27/36; B32B 2250/24; B32B 2307/736; Y10T 428/1352; Y10T 428/31797; B65D 23/0878; B65D 25/205
USPC .................... 428/34.1, 34.2, 35.7, 35.9, 36.9
See application file for complete search history.

(56) References Cited

U.S. PATENT DOCUMENTS 6,274,228 B1 *  8/2001  Ramesh ................. B32B 27/08
                                                                    428/213
2003/0195303 A1 * 10/2003 Ikeda et al. .................... 525/418
(Continued)

FOREIGN PATENT DOCUMENTS

JP       58147479 A  *  9/1983
JP        5 5659           1/1993
(Continued)

*Primary Examiner* — Marc A Patterson
(74) *Attorney, Agent, or Firm* — Oblon, McClelland, Maier & Neustadt, L.L.P.

(57) ABSTRACT

A heat-shrinkable laminated film having: (A) layer mainly having a polyester series resin; (C) layer mainly having a polystyrene series resin or mixture of polyester series and polystyrene series resins; and (B) layer mainly having polyester series and polystyrene series resins and disposed between (A) and (C) layers, the film having excellent heat-shrinkability, transparency, and interlayer-adhesiveness at room temperature, not easily peeled in a high-temperature treatment, inhibited from whitening when bent during processing, and suitable for shrinkage-packaging, shrink-bond-packaging, etc., with (B) layer having: a hard polyester series resin or mixture of hard polyester series and soft polyester series resins; and soft styrene series resin, hard styrene series resin, or mixture thereof, or with a content of the (B) layer polyester series resin smaller than that of the (A) layer one, and a content of the (C) layer polyester series resin smaller than that of the (B) layer one.

20 Claims, 3 Drawing Sheets

(51) Int. Cl.
    *B32B 27/30*     (2006.01)
    *B32B 27/36*     (2006.01)
    *B65D 23/08*     (2006.01)
    *B65D 25/20*     (2006.01)
    *B32B 1/08*     (2006.01)

(56) References Cited

U.S. PATENT DOCUMENTS

| | | | |
|---|---|---|---|
| 2008/0026170 A1* | 1/2008 | Yamada | B29C 61/003 428/34.9 |
| 2008/0057236 A1 | 3/2008 | Yamada et al. | |
| 2010/0279133 A1* | 11/2010 | Kamikage | B32B 27/32 428/483 |

FOREIGN PATENT DOCUMENTS

| | | |
|---|---|---|
| JP | 7 137212 | 5/1995 |
| JP | 2002 351332 | 12/2002 |
| JP | 2006 15745 | 1/2006 |
| JP | 2006-159905 A | 6/2006 |
| JP | 2006-315416 A | 11/2006 |
| JP | 3867095 B2 | 1/2007 |
| JP | 2008 37093 | 2/2008 |
| JP | 2008 62640 | 3/2008 |
| JP | 2008 207487 | 9/2008 |
| JP | 2010 241055 | 10/2010 |
| JP | 2010 264657 | 11/2010 |
| WO | 2006 051884 | 5/2006 |

\* cited by examiner

HEAT-SHRINKABLE LAMINATED FILM, MOLDED PRODUCT AND HEAT-SHRINKABLE LABEL COMPRISING THE FILM, AND CONTAINER

CROSS REFERENCE TO RELATED APPLICATIONS

The present application is a 35 U.S.C. §371 national stage patent application of International patent application PCT/JP2011/070940, filed on Nov. 24, 2010, published as WO/2012/070130 on May 31, 2012, the text of which is incorporated by reference.

TECHNICAL FIELD

The present invention relates to a heat-shrinkable laminated film in a five-layer structure with three kinds of layers which are: a resin composition layer mainly composed of a polyester series resin; a resin composition layer composed of a polystyrene series resin or a mixed resin of a polyester series resin and a polystyrene series resin; and an adhesive layer disposed between the above layers. It also relates to a molded product and a heat-shrinkable label which comprise the film; and a container having the molded product or the label thereon. More specifically, the present invention relates to a heat-shrinkable laminated film which is excellent in heat shrinkability, transparency, and interlayer adhesiveness at room temperature, is not easily peeled even under a high-temperature treatment, is also inhibited from being whitened when bent (namely, whitening on bending) in the processing, and is suitable for such uses as shrink packaging, shrink-bond packaging, and a shrinkable label; and it also relates to a molded product and a heat-shrinkable label which comprise the film; and a container having the molded product or the label thereon.

BACKGROUND ART

Nowadays, soft drinks such as juice and alcoholic beverages such as beer are sold in the form of being filled in containers such as glass bottles or PET bottles, with a heat-shrinkable label indicating the content attached to the containers. As such a heat-shrinkable label, a polyester series heat-shrinkable film is mainly used, which has stiffness at room temperature, exhibits excellent heat resistance and solvent resistance, and has small natural shrinkage. However, the polyester series heat-shrinkable film has a drawback that it shrinks rapidly and therefore is likely to have shrinkage spots or wrinkles when fitted onto a container, compared with a polystyrene series heat-shrinkable film. Further, heat-shrinkable films are often perforated so that they can be easily removed from the container after use; however, the polyester series heat-shrinkable film cannot be cut well along the perforation and thus is sometimes hard to remove from the container.

On the other hand, the polystyrene series heat-shrinkable film which has excellent shrinkability at low temperature is also used as the heat-shrinkable label in many cases. However, the polystyrene series heat-shrinkable film has a drawback that it has a low degree of elongation at low temperature, therefore resulting in breaking of the label fitted onto the container when the container is dropped accidentally at a time of refrigeration. Additionally, the polystyrene series heat-shrinkable film has insufficient solvent resistance. Therefore, if an ordinary organic solvent-based gravure ink is used to print on the polystyrene series heat-shrinkage film, there occur: curling of the film; and blocking of the film after the printing or generation of odor of the organic solvent due to increase in the amount of the solvent remaining on the label.

As solutions to the above problems, there have been reported laminated films in a three-layer structure having two kinds of layers, wherein front and back layers made of a polyester series resin are respectively laminated on a middle layer made of a polystyrene series resin (see Patent Documents 1 to 3 for example). These three-layer laminated films having two kinds of layers adopt a configuration wherein an adhesive layer is formed between the front layer and the middle layer and between the back layer and the middle layer, for the purpose of preventing peeling between the front layer and the middle layer and between the back layer and the middle layer due to friction between the films during transportation, scratching of the film by a person's nail, or some other factors. For example, Patent Document 4 discloses a heat-shrinkable laminated film having a middle layer made of a polystyrene series resin and front and back layers made of a polyester series resin that are laminated with one another with an adhesive layer made of a polyolefin series resin disposed therebetween. However, when this heat-shrinkable laminated film is fitted onto a container, the front and back layers and the middle layer are peeled in the heat shrinking process, thus resulting in a poor appearance. Additionally, films having a polyester-based elastomer as an adhesive layer are disclosed as an approach to solving the peeling caused in the heat shrinking process or by a remaining solvent (see Patent Documents 6, 7, for example). These films are effective in terms of the adhesiveness; however, whitening occurs on the films when they are bent in the processing, namely the whitening on bending, resulting in difficulty in maintaining the design of the film in some cases.

CITATION LIST

Patent Literature

Patent Document 1: Japanese Examined Patent Application Publication (JP-B) No. 5-005659
Patent Document 2: Japanese Patent Application Laid-Open (JP-A) No. 7-137212
Patent Document 3: JP-A No. 2002-351332
Patent Document 4: JP-A No. 2008-207487
Patent Document 5: JP-A No. 2006-15745
Patent Document 6: JP-A No. 2008-37093
Patent Document 7: JP-A No. 2008-62640

SUMMARY OF INVENTION

Problems to be Solved by the Invention

A heat-shrinkable film to be fitted onto containers such as PET bottles and metallic cans needs to be heat-shrunk under relatively high temperature in the labeling process. Therefore, there are increasing development needs also on the heat-shrinkable laminated film having the adhesive layer in between, that it can exhibit sufficient peeling resistance even when processed under a high-temperature atmosphere, and can maintain an excellent appearance. However, films that meet the needs have not been obtained yet.

The present invention has been made in order to solve the above problems; and accordingly, an object of the present invention is to provide a heat-shrinkable laminated film which is excellent in heat shrinkability, transparency, and interlayer adhesiveness at room temperature, is not easily peeled even under a high-temperature treatment, is also inhibited from being whitened when bent (namely, whitening on bending) in the processing, and is suitable for such uses as shrink packaging, shrink-bond packaging, and a shrinkable label.

Another object of the present invention is to provide: a heat-shrinkable label and a molded product which comprise the above heat-shrinkable laminated film; and a container having the molded product or the heat-shrinkable label thereon.

Means for Solving the Problems

The inventors conducted an intensive study on composition of: an (A) layer made of a resin composition containing a polyester series resin as a main component; a (C) layer made of a resin composition containing, as a main component, a polystyrene series resin or a mixed resin of a polystyrene series resin and a polyester series resin; and a (B) layer formed between the (A) layer and the (C) layer, and functioning as an adhesive layer. As a result, they have successfully obtained a film that can solve the problems of the conventional techniques described above, and have completed the present invention.

Namely, the objects of the present invention are achieved by a heat-shrinkable laminated film comprising at least three layers, having an (A) layer, a (C) layer, and a (B) layer disposed between the (A) layer and the (C) layer, the layers comprising the below described resin compositions, respectively (hereinafter, the heat-shrinkable laminated film is referred to as a "first aspect of the present invention".):

(A) layer: a resin composition comprising a polyester series resin as a main component;

(B) layer: a resin composition comprising, as main components, a polyester series resin and a polystyrene series resin, wherein the polyester series resin is a hard polyester series resin or a mixture of the hard polyester series resin and a soft polyester series resin; and the polystyrene series resin is a soft styrene series resin, a hard styrene series resin, or a mixture thereof;

(C) layer: a resin composition comprising a polystyrene series resin as a main component.

In the film of the first aspect of the present invention, the polyester series resin contained in the (A) layer preferably contains a component derived from terephthalic acid as a dicarboxylic acid component, and preferably contains a component derived from ethylene glycol and 1,4-cyclohexanedimethanol as a diol component. Further, in the film of the first aspect of the present invention, the polyester series resin contained in the (C) layer preferably contains an aromatic vinyl hydrocarbon-conjugated diene copolymer. Moreover, a mass ratio between the polyester series resin and the polystyrene series resin contained in the (B) layer is preferably (polyester series resin)/(polystyrene series resin)=90/10 to 30/70. Additionally, in the film of the first aspect of the present invention, the (B) layer or the (C) layer, or the (B) layer and the (C) layer preferably contain(s) a compatibilizer which facilitates compatibility between the polyester series resin and the polystyrene series resin.

In addition, the film of the first aspect of the present invention is preferably in a five-layer structure being (the (A) layer)/(the (B) layer)/(the (C) layer)/(the (B) layer)/(the (A) layer); and when cutting the five-layer heat shrinkable laminated film to obtain a rectangle film piece having a size of 110 mm in a drawing direction (MD (Machine Direction)) of the film and 235 mm in a direction orthogonal thereto (TD (Transverse Direction)), overlapping a portion of an (A) layer face on one end side of the rectangle film piece in the drawing direction (MD) and a portion of an (A) layer face on the other end side of the rectangle film piece in the drawing direction (MD) with each other over the film piece in a manner parallel to the drawing direction (MD), sealing the portions by a solvent to form a cylindrical film having an overlapping portion of 2 to 7 mm in width, thereafter fitting this cylindrical film around a square-shaped PET bottle having a capacity of 350 ml, dipping it in hot water of 99° C. for 10 seconds, and then returning it to room temperature, a misalignment width between an edge of the (A) layer in the drawing direction (MD) and an edge of the (C) layer in the drawing direction (MD), or a misalignment width between the edge of the (A) layer as well as an edge of the (B) layer in the drawing direction (MD) and the edge of the (C) layer in the drawing direction (MD), the edges being sealed at the overlapping portion, is preferably not more than 5% of the overlapping width of the above overlapping portion.

Further, the film of the first aspect of the present invention preferably has a heat shrinkage ratio of 20% or more in at least one direction when dipped in hot water of 80° C. for 10 seconds.

Additionally, the objects of the present invention are also achieved by a heat-shrinkable laminated film comprising at least three layers, having an (A) layer, a (C) layer, and a (B) layer disposed between the (A) layer and the (B) layer, the layers comprising the resin compositions below, respectively (hereinafter, the heat-shrinkable laminated film is referred to as a "second aspect of the present invention".):

(A) layer: a resin composition comprising a polyester series resin as a main component;

(B) layer: a resin composition comprising a polyester series resin and a polystyrene series resin as main components, wherein a content ratio of the polyester series resin is smaller than a content ratio of the polyester series resin contained in the (A) layer.

(C) layer: a resin composition comprising a polyester series resin and a polystyrene series resin as main components, wherein a content ratio of the polyester series resin is smaller than the content ratio of the polyester series resin contained in the (B) layer.

In the film of the second aspect of the present invention, the (B) layer or the (C) layer, or the (B) layer and the (C) layer preferably contain(s) a compatibilizer which facilitates compatibility between a polyester series resin and a polystyrene series resin, and this compatibilizer is preferably at least one selected from (a) to (e) below:

(a) an oxazoline group-containing styrene series copolymer;

(b) a styrene-maleic anhydride copolymer;

(c) a polyester series elastomer or a modified polyester series elastomer;

(d) a polystyrene series elastomer or a modified polystyrene series elastomer;

(e) a resin composition being a graft copolymer having a stem component and a branch component different from each other, wherein the stem component or the branch component of the graft copolymer is a polyester series resin or a polystyrene series resin.

In the film of the second aspect of the present invention, the polystyrene series resin contained in the (C) layer preferably contains an aromatic vinyl hydrocarbon-conjugated diene copolymer. Further, in the film of the second aspect of the present invention, the polyester series resin contained in the (A) layer preferably contains a component derived from terephthalic acid as a dicarboxylic acid component, and preferably contains a component derived from ethylene glycol and 1,4-cyclohexanedimethanol as a diol component.

The film of the second aspect of the present invention is preferably in a five-layer structure being (the (A) layer)/(the (B) layer)/(the (C) layer)/(the (B) layer)/(the (A) layer); and interlayer peeling strength of the film is preferably 1 N/15 mm width or more, when the five-layer heat shrinkable laminated film is cut to obtain a test piece in a size of 150 mm in a main shrinking direction of the film and 15 mm in a direction orthogonal to the main shrinking direction; a part of the (A) layer is peeled from an edge of the test piece in the main shrinking direction to form a peeled portion on the (A) layer side and to form, on the (C) layer side, a portion from which the part of the (A) layer is peeled apart; and the peeled portion on the (A) layer side and the portion on the (C) layer side from which the part of the (A) layer is peeled apart are sandwiched by a chuck of a tensile testing machine to conduct a 180-degree peel test at a test speed of 100 mm/min with respect to the main shrinking direction.

Moreover, the film of the second aspect of the present invention preferably has a heat shrinkage ratio of 20% or more in the main shrinking direction when dipped in hot water of 80° C. for 10 seconds; and preferably has a haze in accordance with JIS K7105 of 10% or less.

In addition, the objects of the present invention are also achieved by a molded product and a heat-shrinkable label comprising, as a base material, the heat-shrinkable laminated film of the first aspect or the second aspect of the present invention, and by a container having the molded product or the label thereon.

Effects of the Invention

The film of the first aspect of the present invention comprises: the (A) layer composed of a resin composition comprising a polyester series resin as a main component; the (C) layer composed of a resin composition comprising a polystyrene series resin as a main component; and the (B) layer composed of a resin composition comprising a predetermined polyester series resin and a predetermined polystyrene series resin as main components, and disposed between the (A) layer and the (C) layer. Thereby, with the film of the first aspect of the present invention, it is possible to provide a heat-shrinkable laminated film which exhibits excellent heat shrinkability, also has the (A) layer and the (C) layer that are not easily peeled even when the film is processed at high temperature, and thus has heat resistance and an excellent appearance.

Additionally, the film of the second aspect of the present invention comprises: the (A) layer composed of a resin composition comprising a polyester series resin as a main component; the (B) layer composed of a resin composition comprising a polyester series resin and a polystyrene series resin as main components, wherein a content ratio of the polyester series resin is smaller than a content ratio of the polyester series resin contained in the (A) layer; and the (C) layer composed of a resin composition in which a content ratio of the polyester series resin is smaller than the content ratio of the polyester series resin contained in the (B) layer. Thereby, with the film of the second aspect of the present invention, it is possible to provide a heat-shrinkable film which exhibits excellent heat shrinkability and excellent transparency, can also be inhibited from being peeled during transportation, by a hand nail, or in a high-temperature treatment in a bottle fitting process, and has an excellent appearance and workability, with inhibition of the whitening of the film from occurring when the film is bent in the processing and the like, which has been difficult to attain with the conventional techniques.

Moreover, the films of the first and the second aspects of the present invention are used to form the molded product and the heat-shrinkable label comprising the film of the first aspect and of the second aspect of the present invention. Therefore, it is possible to provide a molded product and a heat-shrinkable label suitably employed in packaging, and a container fitted with the label having an excellent appearance.

MODES FOR CARRYING OUT THE INVENTION

Figure 1:
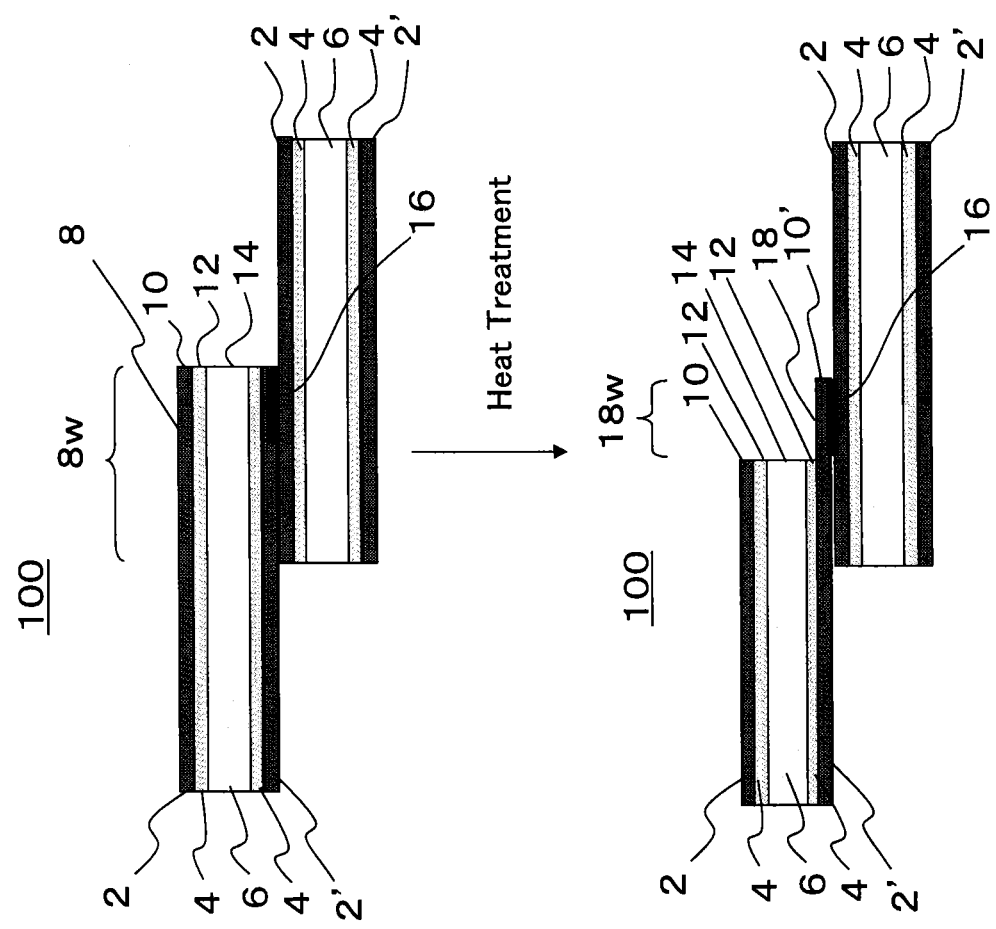
FIG. 1 is a cross-sectional view (Part 1) of the film showing the vicinity of the overlapping portion in a preferable embodiment of the film of the present invention.

Hereinafter, the heat-shrinkable laminated film, the molded product and the heat-shrinkable label having this film as a base material, and the container having this molded product or this heat-shrinkable label fitted thereon, of the present invention will be described in detail.

In this description, the expression "comprising as a main component" intends to allow other components to be contained in a range not preventing the function and the effect of the resin constituting each layer. Further, this expression does not specifically limit a content ratio; however, it means that a content ratio of the main component to the total mass of the components of each layer, is 50 mass % or more, preferably 60 mass % or more, more preferably 70 mass % or more, and 100 mass % or less, unless otherwise indicated.

[Heat-Shrinkable Laminated Film]

(Film of the First Aspect of the Present Invention)

The film of the first aspect of the present invention is a heat-shrinkable laminated film comprising at least three layers, having an (A) layer, a (C) layer, and a (B) layer between the (A) layer and the (C) layer, the layers comprising the below described resin compositions, respectively:

(A) layer: a resin composition comprising a polyester series resin as a main component;

(B) layer: a resin composition comprising, as main components, a polyester series resin and a polystyrene series resin, wherein the polyester series resin is a hard polyester series resin or a mixture of the hard polyester series resin and a soft polyester series resin, and the polystyrene series resin is a soft styrene series resin, a hard styrene series resin, or a mixture thereof;

(C) layer: a resin composition comprising a polystyrene series resin as a main component.

<(A) Layer of the Film of the First Aspect of the Present Invention>

In the film of the first aspect of the present invention, the polyester series resin being the main component of the (A) layer is a resin that can provide the film with stiffness, rupture-resistance, and low-temperature shrinkability, and can inhibit natural shrinkage of the film. In the first aspect of the present invention, a preferred example of the polyester series resin is a polyester series resin derived from a dicarboxylic acid residue and a diol residue. Examples of the dicarboxylic acid residue include residues derived from: aromatic dicarboxylic acids such as terephthalic acid, isophthalic acid, 2-chloroterephthalic acid, 2,5-dichloroterephthalic acid, 2-methylterephthalic acid, 4,4-stilbenedicarboxylic acid, 4,4-biphenyldicarboxylic acid, orthophthalic acid, 2,6-naphthalene dicarboxylic acid, 2,7-naphthalene dicarboxylic acid, bisbenzoic acid, bis(p-carboxyphenyl)methane, anthracene dicarboxylic acid, 4,4-diphenylether dicarboxylic acid, 4,4-diphenoxyethane dicarboxylic acid, 5-Na sulfoisophthalic acid, and ethylenebis-p-benzoic acid; aliphatic dicarboxylic acids such as adipic acid, sebacic acid, azelaic acid, dodecanedioic acid, 1,3-cyclohexane dicarboxylic acid, and 1,4-cyclohexane dicarboxylic acid; and ester derivatives thereof. One of these dicarboxylic acid residues may be contained alone, or two or more thereof may be contained. A polyester resin formed of terephthalic acid and ethylene glycol can be favorably employed as the above polyester series resin.

In the film of the first aspect of the present invention, the polyester series resin being the main component of the (A) layer is more preferably a copolymer in which at least one of the dicarboxylic acid residue and the diol residue is made of two or more kinds of residues. Herein, when two or more kinds of residues are employed, a main residue, namely a residue in the largest mass (mole %) is defined as the first residue; and residues in a mass smaller than the mass of the first residue are defined as the second-and-lower-order residues (that is, the second residue, the third residue, . . . ). Such a mixed system of the dicarboxylic acid residue and the diol residue can suppress crystallization of the polyester series resin obtained, accordingly can inhibit the (A) layer from being crystallized, when employed in the (A) layer, and therefore is preferable.

A preferred example of a mixture of the diol residues may be a mixture of: an ethylene glycol residue as the first residue; and a residue derived from at least one selected from the group consisting of 1,4-butanediol, neopentyl glycol, diethylene glycol, polytetramethylene glycol, and 1,4-cyclohexane dimethanol, preferably a 1,4-cyclohexane dimethanol residue, as the second residue.

Additionally, a preferred example of a mixture of the dicarboxylic acid residues may be a mixture of: terephthalic acid as the first residue; and a residue derived from at least one selected from the group consisting of isophthalic acid, 1,4-cyclohexane dicarboxylic acid, succinic acid and adipic acid, preferably an isophthalic acid residue, as the second residue.

A total content ratio of the dicarboxylic acid residue and the diol residue as the above second-and-lower-order residue is 10 mole % or more, preferably 20 mole % or more, and 40 mole % or less, preferably 35 mole % or less, based on the sum (200 mole %) of the total amount (100 mole %) of the dicarboxylic acid residue and the total amount (100 mole %) of the diol residue. If the content ratio of the second-and-lower-order residue is 10 mole % or more, the degree of crystallization of the polyester obtained can be suppressed. On the other hand, if the contain ratio of the second-and-lower-order residue is 40 mole % or less, the advantageous characteristics of the first residue can be effectively utilized.

For example, when the dicarboxylic acid residue is the terephthalic acid residue, and the diol residue has the ethylene glycol residue as the first residue and the 1,4-cyclohexane dimethanol residue as the second residue, the content ratio of the 1,4-cyclohexane dimethanol residue being the second residue is preferably 10 mole % or more, more preferably mole % or more, still more preferably 25 mole % or more, and preferably 40 mole % or less, more preferably 38 mole % or less, and still more preferably 35 mole % or less, based on the sum (200 mole %) of the total amount (100 mole %) of the terephthalic acid residue being the dicarboxylic acid residue and the total amount (100 mole %) of the ethylene glycol residue and the 1,4-cyclohexane dimethanol residue. With the ethylene glycol residue and the 1,4-cyclohexane dimethanol residue as the diol residues in the above range, there is little likelihood of crystallization of the obtained polyester, and the rupture-resistance of the film can be improved.

Further in the above example, when the dicarboxylic acid residue has the terephthalic acid residue as the first residue and isophthalic acid residue as the second residue, the content ratio of the isophthalic acid being the dicarboxylic acid residue and the 1,4-cyclohexane dimethanol residue being the diol residue is preferably 10 mole % or more, more preferably 15 mole % or more, still more preferably 25 mole % or more, and preferably mole % or less, more preferably 38 mole % or less, and still more preferably 35 mole % or less, based on the sum (200 mole %) of the total amount (100 mole %) of the terephthalic acid residue and the isophthalic acid residue and the total amount (100 mole %) of the ethylene glycol residue and the 1,4-cyclohexane dimethanol residue.

A refractive index ($n_1$) of the polyester series resin is preferably 1.560 or more and more preferably 1.565 or more, and preferably 1.580 or less and more preferably 1.574 or less.

An intrinsic viscosity (IV) of the polyester series resin is preferably 0.5 dl/g or more, more preferably 0.6 dl/g or more, and still more preferably 0.7 dl/g or more, and preferably 1.5 dl/g or less, more preferably 1.2 dl/g or less, and still more preferably 1.0 dl/g or less. If the intrinsic viscosity (IV) is 0.5 dl/g or more, it is possible to inhibit degradation of the strength and the heat-resistance of the film. On the other hand, if the intrinsic viscosity (IV) is 1.5 dl/g or less, it is possible to prevent rupture of the film caused by increase in its elongation tension.

Examples of commercially available products of the polyester series resin include "PETG copolyester 6763" (produced by Eastman Chemical Company); "Embrace LV" (produced by Eastman Chemical Company); and "PETG SKYGREEN S2008" (produced by SK Chemicals Co., Ltd.).

As long as the content of the polyester series resin in the (A) layer is 50 mass % or more, preferably 60 mass % or more, and more preferably 70 mass % or more, based on the total amount of the resins constituting the (A) layer, other resins may also be contained in the (A) layer. Examples of such resins include polyolefin series resins, polystyrene series resins, polycarbonate resins, and acrylic resins. Among these, polystyrene resins are preferred.

Not only the above polyester series resin derived from the dicarboxylic acid residue and the diol residue, but also a polyester resin obtained by polymerization of a monomer having a carboxylic acid residue and an alcohol residue in one molecule, can be employed as the polyester series resin to be contained in the (A) layer. Especially polylactic acid formed by condensation polymerization of lactic acid can be favorably employed since it provides the film with stiffness, low-temperature shrinkability, and low natural shrinkage.

The (A) layer is preferably the outermost layer in view of retaining the film stiffness and inhibiting the natural shrinkage of the film, and in view of the solvent-resistance of the film. If the layer (A) is on the outermost side, even when an ordinary organic solvent-based gravure ink is used to print on the film, there will not occur such problems as curling of the film, blocking of the film or emission of odor of the organic solvent after the printing due to increase in the amount of the solvent remaining on the label, which is thus favorable.

When the (A) layer is on the outermost side, it is preferable to blend a non-compatible resin in the layer constituting the outermost layer of the film or add an antiblocking agent to the layer constituting the outermost layer of the film.

Examples of the antiblocking agent include inorganic particles, inorganic oxides, and carbonates such as silica, talc, and calcium carbonate, and organic particles of cross-linked acrylic type, cross-linked polyester type, cross-linked polystyrene type, and silicone type. Additionally, organic particles having a multilayer structure through multistage polymerization may also be employed. Among these, silica and organic particles are favorable employed.

The above antiblocking agent brings about slipping characteristics or antiblocking characteristics of the film by roughening the surface of the film. Therefore, unless an appropriate amount and an appropriate kind thereof are selected, the transparency or the polish of the film will be deteriorated. The same applies to the heat-shrinkable film in a configuration of having the (A) layer on the outermost side. Accordingly, the amount of the antiblocking agent added is preferably 0.01 mass % or more and 2 mass % or less, more preferably 0.015 mass % or more and 1.5 mass % or less, and still more preferably 0.02 mass % or more and 1 mass % or less, based on the total mass (100 mass %) of the resin composition constituting the (A) layer. If the amount of the antiblocking agent added is too small, it is difficult to deposit the antiblocking agent on the film surface and to form unevenness thereon, and therefore it is difficult to bring about sufficient slipping characteristics or antiblocking characteristics of the film. Conversely, if the addition amount is too large, the surface of the film tends to be excessively uneven, resulting in deterioration of the transparency of the film due to its surface roughness and disorganized rolling of the film due to its excessive slippage.

A shape of the antiblocking agent is not particularly limited; however, a spherical shape is preferably employed in view of inhibiting agglomeration of the antiblocking agent and ensuring uniform dispersion thereof in the (A) layer; inhibiting diffused reflection of transmitting light and the unevenness formed on the film surface. An average particle diameter of the antiblocking agent is preferably 0.5 μm or more and more preferably 1 μm or more, and preferably 10 μm or less, more preferably 8 μm or less, and still more preferably 6 μm or less. If the particle diameter of the antiblocking agent is too small, it is difficult to deposit the antiblocking agent onto the film surface; and even if the bead-sized particle is deposited onto the film surface, it is difficult to provide the film surface with unevenness sufficient to bring about the slipping characteristics or the antiblocking characteristics. On the other hand, if the particle diameter of the antiblocking agent is too large, when printing is given on the film of the present invention to improve its design, the film is likely to have ink deficiency, resulting in a poor appearance of the printed pattern, which is thus unfavorable. A particle diameter distribution of the antiblocking agent is not particularly limited; however, in view of the above problems regarding the size of the particle, it is preferable for the particle diameter distribution to be small. If the particle diameter distribution is too large, particles having a particle diameter outside the above preferred range are likely to be contained, which is thus unfavorable.

<(C) Layer of the Film of the First Aspect of the Present Invention>

In the film of the first aspect of the present invention, the (C) layer is made of a resin composition comprising a polystyrene series resin as a main component. As the polystyrene series resin, a block copolymer of a styrene series hydrocarbon and a conjugated diene series hydrocarbon is favorably employed.

Examples of the styrene series hydrocarbon include poly (alkyl styrene) such as polystyrene, poly(p-, m- or o-methyl styrene), poly(2,4-, 2,5-, 3,4- or 3,5-dimethyl styrene), and poly(p-t-butyl styrene); polyhalogenated styrene such as poly(o-, m- or p-chloro styrene), poly(o-, m- or p-bromo styrene), poly(o-, m- or p-fluoro styrene), and poly(o-methyl-p-fluoro styrene); poly(halogenated substituted alkyl styrene) such as poly(o-, m- or p-chloromethyl styrene); poly(alkoxy styrene) such as poly(p-, m- or o-methoxy styrene), poly(o-, m- or p-ethoxy styrene); poly(carboxy alkyl styrene) such as poly(o-, m- or p-carboxy methyl styrene); poly(alkyl ether styrene) such as poly(p-vinylbenzyl propyl ether); poly(alkyl silyl styrene) such as poly(p-trimethyl silyl styrene); and also poly(vinylbenzyl dimethoxy phosphide). A block formed of the above styrene series hydrocarbons may have a homopolymer thereof, a copolymer thereof and/or a copolymerable monomer other than the styrene series hydrocarbons.

Examples of the conjugated diene series hydrocarbon include: butadiene; isoprene; 2-methyl-1,3-butadiene; 2,3-dimethyl-1,3-butadiene; 1,3-pentadiene; and 1,3-hexadiene. A block formed of the above conjugated diene series hydrocarbons may have a homopolymer thereof, a copolymer thereof and/or a copolymerable monomer other than the conjugated diene series hydrocarbons.

A preferred example of the block copolymer of the styrene series hydrocarbon and the conjugated diene series hydrocarbon to be employed in the (C) layer is a styrene-butadiene block copolymer (SBS), wherein the styrene series hydrocarbon is styrene and the conjugated diene series hydrocarbon is butadiene. In SBS, a mass % ratio of styrene/butadiene is preferably (95 to 60)/(5 to 40), more preferably (93 to 60)/(7 to 40), and still more preferably (90 to 60)/(10 to 40), based on the total mass of SBS as 100 mass %. Additionally, a melt flow rate (MFR) measurement of SBS (measurement conditions: temperature 200° C., load 49 N) is preferably 2 g/10 min or more and more preferably 3 g/10 min or more, and preferably 15 g/10 min or less, more preferably 10 g/10 min or less, and still more preferably 8 g/10 min or less.

Another preferred example of the block copolymer of the styrene series hydrocarbon and the conjugated diene series hydrocarbon to be employed in the (C) layer is a styrene-isoprene-butadiene block copolymer (SIBS). In SIBS, a mass % ratio of styrene/isoprene/butadiene is preferably (60 to 90)/(5 to 40)/(5 to 30), more preferably (60 to 85)/(10 to 30)/(5 to 25), and still more preferably (60 to 80)/(10 to 25)/(5 to 20), based on the total mass of SIBS as 100 mass %. Additionally, a melt flow rate (MFR) measurement of SIBS (measurement conditions: temperature 200° C., load 49 N) is preferably 2 g/10 min or more, and more preferably 3 g/10 min or more, and preferably 15 g/10 min or less, more preferably 10 g/10 min or less, and still more preferably 8 g/10 min or less. If the content of butadiene is large and the content of isoprene is small, butadiene heated inside an extruder or the like develops cross-linking reaction, leading to increase of a gelatinous material. On the other hand, if the content of butadiene is small and the content of isoprene is large, a unit price of the source material increase, likely resulting in increase in the production cost.

The styrene series resin to be used in the (C) layer may not only be of one kind but two or more kinds may be used in mixture. For example, if the above polystyrene series resin is a mixture of SBS and SIBS, a mass % ratio of SBS/SIBS is preferably (90 to 10)/(10 to 90), more preferably (80 to 20)/(20 to 80), and still more preferably (70 to 30)/(30 to 70), based on 100 mass % of the mixture of SBS and SIBS.

A content ratio of the polystyrene series resin in the (C) layer is preferably 50 mass % or more, more preferably 65 mass % or more, and still more preferably 80 mass % or more, of the total amount of the resins constituting the (C) layer. However, if general purpose polystyrene (GPPS) is to be contained, a content ratio of GPPS to be mixed in is preferably 20 mass % or less, more preferably 15 mass % or less, and still more preferably 10 mass % or less, of the total amount of the resins constituting the (C) layer, since Tg (a peak temperature of the loss elastic modulus E") of GPPS is very high as around 100° C.

As long as the content of the polystyrene series resin in the (C) layer is 50 mass % or more of the total amount of the resins constituting the (C) layer as mentioned above, other resins may also be mixed in. Examples of such other resins include polyester series resins, polyolefin series resins, acrylic resins, and polycarbonate resins. Among these, polyester series resins are preferred.

Furthermore, a compatibilizer to facilitate compatibility between the polyester series resin and the polystyrene series resin may also be added to the (C) layer. The types of the compatibilizer that can be added are not particularly limited; however, in the case of adding the polyester series resin, the polyolefin series resin, the acrylic resin, the polycarbonate resin etc. to the resin constituting the (C) layer as additional resins for example, a compatibilizer that can improve dispersibility of these resins is preferred. An example of the compatibilizer may be a resin copolymer having high affinity or being compatible with the resin constituting the (C) layer, or a resin having a polar group being reactive with or having high affinity with one of the resins constituting the (C) layer, and also having high affinity or being compatible with another resin constituting the (C) layer. A content of the compatibilizer may be adequately determined in accordance with the type and the property of the resins used in the (C) layer. Details of the compatibilizer will be given in the descriptions of the (B) layer.

The above block copolymer of the styrene series hydrocarbon and the conjugated diene series hydrocarbon can be adjusted to almost have a desired value of a refractive index ($n_2$) measured in accordance with JIS K7142, by adequately adjusting the composition ratio of the styrene series hydrocarbon and the conjugated diene series hydrocarbon. Accordingly, a refractive index ($n_2$) within a range of $n_1 \pm 0.02$ can be attained by adjusting the composition ratio of the styrene series hydrocarbon and the conjugated diene series hydrocarbon in accordance with the refractive index ($n_1$) of the polyester series resin contained in the (A) layer mentioned above. To obtain this predetermined refractive index, the block copolymer of the styrene series hydrocarbon and the conjugated diene series hydrocarbon may be adjusted alone, or may be adjusted with two or more resins mixed in.

In the film of the first aspect of the present invention, a storage elastic modulus (E') of the polystyrene series resin contained in the (C) layer in the conditions of an oscillation frequency of 10 Hz, a distortion of 0.1% and a temperature of 0° C., is preferably $1.00 \times 10^9$ Pa or more, and more preferably $1.50 \times 10^9$ Pa or more. The storage elastic modulus (E') at 0° C. shows the film stiffness, namely the film rigidity. With the storage elastic modulus (E') of $1.00 \times 10^9$ Pa or more, a film with transparency and stiffness can be obtained. This storage elastic modulus (E') can be obtained by using the block copolymer of the styrene series hydrocarbon and the conjugated diene series hydrocarbon alone, by using a mixture of two or more of the copolymers, or by mixing it with other resins in a range not deteriorating the transparency.

In the case of using, as the main component of the (C) layer, a block copolymer mixture of a styrene series hydrocarbon and a conjugated diene series hydrocarbon or a mixture of this copolymer and other resins, appropriate selection of a copolymer or a resin to provide rupture-resistance and a copolymer or a resin to provide stiffness brings about favorable results. In specific, by combining a styrene series hydrocarbon-conjugated diene series hydrocarbon block copolymer having high rupture-resistance with a styrene series hydrocarbon-conjugated diene series hydrocarbon block copolymer having high stiffness, or by mixing the styrene series hydrocarbon-conjugated diene series hydrocarbon block copolymer having high rupture-resistance with other resins having high stiffness, it is possible to adjust the total composition of the styrene series hydrocarbon-conjugated diene series hydrocarbon or the mixture thereof with other resins, to meet the desired refractive index ($n_2$) and storage elastic modulus (E') at 0° C.

Preferred examples of the styrene series hydrocarbon-conjugated diene series hydrocarbon block copolymer which can provide rupture-resistance are pure block SBS and random block SBS. Especially preferred are those having viscoelastic characteristics in which the storage elastic modulus (E') at 0° C. is $1.00 \times 10^8$ Pa or more and $1.00 \times 10^9$ Pa or less and also at least one of the peak temperatures of the loss elastic modulus (E") is at $-20°$ C. or less. If the storage elastic modulus at 0° C. is $1.0 \times 10^8$ Pa or more, it is possible to provide a film with rigidity by increasing the blending amount of the resin that provides stiffness. On the other hand, in the peak temperatures of the loss elastic modulus (E"), the temperature on a low-temperature side mainly shows the rupture-resistance. This property may vary depending on elongation conditions. However, if the peak temperature of the loss elastic modulus (E") is not at $-20°$ C. or less before elongation, it may be difficult to provide a laminated film with sufficient film rupture resistance.

Additionally, examples of the resin that can give stiffness are copolymers of a styrene series hydrocarbon having a storage elastic modulus (E') of $2.00 \times 10^9$ Pa or more at 0° C., such as a block copolymer of a styrene series hydrocarbon and a conjugated diene series hydrocarbon with the block structure thereof controlled, polystyrene, a copolymer of a styrene series hydrocarbon and an aliphatic unsaturated carboxylic acid ester.

An example of the block copolymer of a styrene series hydrocarbon and a conjugated diene series hydrocarbon with the block structure thereof controlled may be SBS having a storage elastic modulus (E') of $2.00 \times 10^9$ Pa or more at 0° C. as a property of the styrene-butadiene block copolymer. A styrene-butadiene composition ratio (mass %) of SBS to satisfy this is preferably adjusted to be styrene/butadiene= (95 to 80)/(5 to 20), based on 100 mass % of SBS as a whole.

The structure of the block copolymer and the structure of each block part are preferably a random block and a tapered block. In order to control the shrinkage property, it is more preferable that the peak temperature of the loss elastic modulus (E″) be at 40° C. or more, and still more preferable that there be no clear peak temperatures of the loss elastic modulus (E″) at 40° C. or less. When the peak temperature of the loss elastic modulus (E″) is apparently absent until 40° C., a storage elastic modulus characteristic which is almost the same as that of polystyrene can be exhibited, therefore enabling stiffness to the film. Moreover, it is preferable for the peak temperature of the loss elastic modulus (E″) to be at 40° C. or more, preferably in a range of 40° C. or more and 90° C. or less. The peak temperature is a factor that mainly affects the shrinkage ratio, and therefore if this temperature is in a range of 40° C. or more and 90° C. or less, the natural shrinkage ratio and the low-temperature shrinkage ratio do not degrade drastically.

A polymerization method for the styrene series hydrocarbon-conjugated diene series hydrocarbon copolymer that satisfies the above viscoelastic property will be described below. A part of styrene or butadiene is normally polymerized; and after completion of the polymerization, a mixture of a styrene monomer and a butadiene monomer is added to continue the polymerization reaction. Thereby, butadiene having high polymerization activity is preferentially polymerized, ending up in formation of a block of a single monomer of styrene.

For example, styrene is homopolymerized first, and after completion of the polymerization, a mixture of a styrene monomer and a butadiene monomer is added thereto, to continue the polymerization, thereby obtaining a styrene-butadiene block copolymer having a styrene-butadiene copolymer portion with a ratio of the styrene/butadiene monomer gradually changing, between the styrene block and the butadiene block. With such a portion provided, a polymer obtained can have the above viscoelastic property. In this case, it is not possible to clearly identify two peaks attributed to the butadiene block and the styrene block, and only one peak appears to be present. Namely, in a pure block or a block structure like SBS of a random block having clear presence of the butadiene block, Tg attributed to the butadiene block mainly exists at 0° C. or less, therefore causing difficulty in having a storage elastic modulus (E′) of a predetermined value or more at 0° C.

In addition, the molecular weight is adjusted in a range that the melt flow rate (MFR) measurement (measurement conditions: temperature 200° C.; load 49 N) is preferably 2 g/10 min or more and 15 g/10 min or less. A mixing amount of the styrene-butadiene block copolymer that gives stiffness is adequately adjusted in accordance with the properties of the heat-shrinkable laminated film, and is desirably adjusted in a range of 20 mass % or more and 80 mass % or less, preferably 40 mass % or more and 70 mass % or less of the total amount of the resins constituting the (C) layer. If the mixing amount of the styrene-butadiene block copolymer is 80 mass % or less of the total resin, the film stiffness can be largely improved and degradation of the rupture-resistance can be inhibited. On the other hand, if it is 20 mass % or more of the total resin, sufficient stiffness can be provided to the film.

Regarding the molecular weight of the polystyrene series resin contained in the (C) layer of the film of the first aspect of the present invention, the weight (mass) average molecular weight (Mw) is preferably 100,000 or more and more preferably 150,000 or more, and preferably 500,000 or less, more preferably 400,000 or less, still more preferably 300,000 or less. If the weight (mass) average molecular weight (Mw) of the polystyrene series resin is 100,000 or more, problems such as deterioration of the film do not occur, which is thus favorable. Moreover, if the molecular weight of the polystyrene series resin is 500,000 or less, there is no need to adjust the flow property thereof and are no problems such as degradation of extrusion performance, which is thus favorable.

In a case of employing a copolymer of a styrene series hydrocarbon and an aliphatic unsaturated carboxylic acid ester as the polystyrene series resin described above, examples of the aliphatic unsaturated carboxylic acid ester to be copolymerized with the styrene series hydrocarbon may be methyl (meth)acrylate, butyl (meth)acrylate, 2-ethylhexyl (meth)acrylate, lauryl (meth)acrylate, and stearyl (meth)acrylate. A preferred example is a copolymer of styrene and butyl (meth)acrylate; and a more preferred is a copolymer in which: the amount of styrene is in a range of 70 mass % or more and 90 mass % or less; Tg (a peak temperature of the loss elastic modulus E″) is 50° C. or more and 90° C. or less; and the melt flow rate (MFR) measurement (measurement conditions: temperature 200° C.; load 49 N) is 2 g/10 min or more and 15 g/10 min or less. It should be noted that (meth)acrylate mentioned above indicates acrylate and/or methacrylate.

The content of the copolymer of a styrene series hydrocarbon and an aliphatic unsaturated carboxylic acid ester in the (C) layer is adequately determined in accordance with the composition ratio thereof. It is typically adjusted in a range of 20 mass % or more and 70 mass % or less based on the total amount of the resin constituting the (C) layer. If the content is 70 mass % or less, the film stiffness can be largely improved and favorable rupture-resistance can be maintained. Further, the content is 20 mass % or more, sufficient stiffness can be provided to the film.

<(B) Layer of the Film of the First Aspect of the Present Invention>

The (B) layer of the film of the first aspect of the present invention is made of a resin composition comprising a polyester series resin and a polystyrene series resin as main components, wherein the polyester series resin is a hard polyester series resin or a mixture of the hard polyester series resin and a soft polyester series resin, and the polystyrene series resin is a soft styrene series resin, a hard styrene series resin, or a mixture thereof. In the film of the first aspect of the present invention, the (B) layer functions as an adhesive layer for the (A) layer and the (C) layer.

The inventors conducted an intensive study on: the composition of the polyester series resin and the polystyrene series resin that are used in the (B) layer of the film of the first aspect of the present invention; the elastic modulus of each resin; the flow property of a mixture of each resin, and so on. As a result, they discovered that when a hard polyester series resin or a mixture of the hard polyester series resin and a soft polyester series resin is used in combination with a hard styrene series resin, a soft styrene series resin or a mixture of these, the peeling strength between the (A) layer and the (C) layer is favorable and can be kept favorable even after the film is heat-shrunk.

The hard polyester series resin used in the (B) layer of the film of the first aspect of the present invention refers to a polyester series resin having a storage elastic modulus (E′) of preferably $3.00 \times 10^8$ Pa or more, more preferably $4.00 \times 10^8$ Pa or more, and still more preferably $5.00 \times 10^8$ Pa or more, under the conditions of an oscillation frequency of 10 Hz, a distortion of 0.1%, and room temperature (30° C.).

Specific examples include: polyethylene terephthalate, polyethylene naphthalate, polybutylene terephthalate, a polyester formed of terephthalic acid and 1,4-cyclohexanedimethanol; a copolymer thereof; and a copolyester containing a small amount of isophthalic acid, ethylene glycol, short-chain polyalkylene glycol, 1,4-cyclohexanedimethanol etc. as copolymerization components. The hard polyester series resin employed does not have to be of one kind. Two or more kinds thereof may be used in mixture, and in this case, a mixing amount thereof can be adequately determined in accordance with the properties of the resins to be employed. In the hard polyester series resin, the amount of the terephthalic acid residue is preferably 60 mole % or more and more preferably 70 mole % or more of the dicarboxylic acid component.

Examples of commercially available products of the hard polyester series resin include: SKYGREEN PETG S2008 (produced by SK Chemicals Co., Ltd.); Novaduran 5605 (produced by Mitsubishi Engineering Plastics Corporation); and Embrace LV (produced by Eastman Chemical Company).

Next, the soft polyester series resin used in the (B) layer refers to a polyester series resin having a storage elastic modulus (E') of preferably less than $3.00 \times 10^8$ Pa, more preferably $2.50 \times 10^8$ Pa or less, and still more preferably $2.00 \times 10^8$ Pa or less, under the conditions of an oscillation frequency of 10 Hz, a distortion of 0.1%, and room temperature (30° C.).

Examples of a diol component to constitute the soft polyester series resin are polyalkylene ether glycols, for example, polyethylene glycol, poly(propylene ether) glycol, poly(tetramethylene ether) glycol, and poly(hexamethylene ether) glycol. Additionally, examples of a dicarboxylic acid component to constitute the soft polyester series resin are long-chain dicarboxylic acids having a carbon number of 6 or more, for example succinic acid, glutaric acid, pimelic acid, suberic acid, adipic acid, azelaic acid, and sebacic acid. Among these, preferred is a soft polyester series resin containing polyalkylene ether glycol as a diol component; a soft polyester series resin containing a long-chain dicarboxylic acid component having a carbon number of 6 or more; or a soft polyester series resin containing both.

The soft polyester series resin is not necessarily used alone; two or more different kinds thereof may be used in mixture. In this case, a mixing amount can be adequately determined in accordance with the properties of the resins to be used. In the soft polyester series resin in the present invention, the amount of the terephthalic acid residue in the dicarboxylic acid component constituting polyester is preferably 70 mole % or less and more preferably 60 mole % or less of the dicarboxylic acid component.

Examples of commercially available products of the soft polyester series resin include: VYLON 30P (produced by TOYOBO CO., LTD.); Polyester SP-154 (produced by The Nippon Synthetic Chemical Industry Co., Ltd.); and PRIMALLOY A series, B series, and modified type (produced by Mitsubishi Chemical Corporation).

Next, the hard polystyrene series resin used in the (B) layer of the film of the first aspect of the present invention refers to a styrene series resin having a storage elastic modulus (E') of preferably $4.00 \times 10^8$ Pa or more, more preferably $5.00 \times 10^8$ Pa or more, and still more preferably $6.00 \times 10^8$ Pa or more, under the conditions of an oscillation frequency of 10 Hz, a distortion of 0.1%, and room temperature (30° C.).

A specific example of the hard polystyrene series resin is a copolymer of: an aromatic vinyl monomer such as styrene, α-methyl styrene, o-, m- or p-methyl styrene, vinylxylene, monochloro styrene, dichloro styrene, monobromo styrene, dibromo styrene, fluoro styrene, p-tert-butyl styrene, ethyl styrene, and vinyl naphthalene; and a monomer of an unsaturated aliphatic hydrocarbon such as ethylene, propylene, isoprene, 3-methyl-1-butene, or a monomer of a hydrogenated product thereof, wherein a content ratio of the aromatic vinyl monomer is 35 mass % or more, preferably 40 mass % or more, and more preferably 50 mass % or more of all the monomers (100 mass %) constituting the hard polystyrene series resin. The aromatic vinyl monomer, the monomer of the unsaturated aliphatic hydrocarbon, or the monomer of the hydrogenated product thereof may be used singularly, or two or more kinds thereof may be used in combination.

Specific examples of the hard polystyrene series resin include: a styrene-butyl acrylate copolymer; styrene-butadiene block copolymer (SBS); styrene-isoprene block copolymer (SIS); styrene-ethylene-propylene copolymer; styrene-ethylene-butylene copolymer; and modifications thereof by a modifying agent having a polar group. Additionally, when the hard styrene series resin is a block copolymer, the copolymerization configuration is not particularly limited and may be a pure block, a random block, a tapered block, and the like. Further, the block units may be repeated a number of times. Specifically in the case of the styrene-butadiene block copolymer, the block units may be repeated a number of times as in a styrene-butadiene block copolymer, a styrene-butadiene-styrene block copolymer, and a styrene-butadiene-styrene-butadiene block copolymer. Other copolymerization components may also be contained.

Examples of commercially available products of the hard polystyrene series resin include: Asaflex 825 (produced by Asahi Kasei Chemicals Corporation); DK11 (produced by Chevron Phillips Chemical Company); Dynalon 9901P (produced by JSR Corporation); and Toughtec H 1043 (produced by Asahi Kasei Chemicals Corporation).

Next, the soft polystyrene series resin used in the (B) layer of the film of the first aspect of the present invention refers to a styrene series resin having a storage elastic modulus (E') of preferably less than $4.00 \times 10^8$ Pa, more preferably $2.00 \times 10^8$ Pa or less, and still more preferably $1.00 \times 10^8$ Pa or less, under the conditions of an oscillation frequency of 10 Hz, a distortion of 0.1%, and room temperature (30° C.).

An example of the soft polystyrene series resin is a copolymer of: an aromatic vinyl monomer such as styrene, α-methyl styrene, o-, m- or p-methyl styrene, vinylxylene, monochloro styrene, dichloro styrene, monobromo styrene, dibromo styrene, fluoro styrene, p-tert-butyl styrene, ethyl styrene, and vinyl naphthalene; and a monomer of an unsaturated aliphatic hydrocarbon such as ethylene, propylene, isoprene, 3-methyl-1-butene, or a monomer of a hydrogenated product thereof. It is good if a content ratio of the aromatic vinyl monomer is preferably 90 mass % or less, more preferably 80 mass % or less, and still more preferably 75 mass % or less of all the monomers (100 mass %) constituting the soft polystyrene series resin. The aromatic vinyl monomer, the monomer of the unsaturated aliphatic hydrocarbon, or the monomer of the hydrogenated product thereof may be used singularly, or two or more kinds thereof may be used in combination.

Specific examples of the soft polystyrene series resin include: a styrene-butyl acrylate copolymer; styrene-butadiene block copolymer (SBS); styrene-isoprene block copolymer (SIS); styrene-ethylene-propylene copolymer; styrene-ethylene-butylene copolymer; and modifications thereof by a modifying agent having a polar group. Additionally, when the soft styrene series resin is a block copolymer, the copolymerization configuration is not particularly limited and may be a pure block, a random block, a tapered block, and the like. Further, the block units may be repeated a number of times. Specifically in the case of the styrene-butadiene block copolymer, the block units may be repeated a number of times as in a styrene-butadiene block copolymer, a styrene-butadiene-styrene block copolymer, and a styrene-butadiene-styrene-butadiene block copolymer. Other copolymerization components may also be contained.

Examples of commercially available products of the soft polystyrene series resin include: Hybrar 7125 produced by Kuraray Co., Ltd.; Toughtech M1911 (produced by Asahi Kasei Chemicals Corporation); and Asaflex 830 (produced by Asahi Kasei Chemicals Corporation).

A mass ratio between the polyester series resin (a hard polyester series resin, or a mixture of the hard polyester series resin and a soft polyester series resin) and the polystyrene series resin (a soft styrene series resin, a hard styrene series resin, or a mixture thereof) is (polyester series resin)/(polystyrene series resin)=preferably 90/10 to 30/70, more preferably 80/20 to 40/60, and still more preferably 70/30 to 50/50.

If the content ratio of the polyester series resin to the polystyrene series resin is in the above range in the (B) layer, the resin composition can maintain a certain elastic modulus even in a temperature range of a high-temperature treatment and the adhesion strength between the (A) layer and the (C) layer can be maintained, which is thus favorable.

The (B) layer in the film of the first aspect of the present invention may contain a compatibilizer which facilitates compatibility between the polyester series resin and the polystyrene series resin. With the compatibilizer contained in the (B) layer, dispersibility of the polyester series resin or the styrene series resin improves, the film transparency is enhanced, and uniformity in thickness is attained, which is thus favorable in view of improving productivity, and further the interlayer adhesion strength can be improved by use of a reactive compatibilizer.

An example of the compatibilizer to be contained in the (B) layer may be a styrene series block copolymer or graft copolymer which has a polar group having high affinity with the polyester series resin contained in the (A) layer or has a polar group that can react with the polyester series resin, and which also has a portion being compatible with or having high affinity with the polystyrene series resin contained in the (C) layer. Specific examples of the polar group having high affinity with a polyester series resin or the functional group that can react therewith include an acid anhydride group, a carboxylic acid group, a carboxylic acid ester group, a carboxylic acid chloride group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imide group, and an oxazoline group. Among these, preferred are an anhydride group, a carboxylic group, a carboxylic acid ester group, and an oxazoline group.

The expression "has a portion being compatible with a polystyrene series resin" means having a chain in affinity with a polystyrene series resin. Specific examples include random copolymers having a styrene chain, a styrene series copolymer segment, etc. as a main chain, a block chain, or a graft chain, or having a styrene series monomer unit.

Examples of commercially available products of the above compatibilizer include: Dynaron 8630P (produced by JSR Co., Ltd.); Modiper A4100 (produced by NOF CORPORATION Chemical Division); and EPOCROS RPS-1005 (produced by Nippon Shokubai Co. Ltd.). Among these, EPOCROS RPS-1005 (produced by Nippon Shokubai Co. Ltd.) is preferred.

A content of the compatibilizer in the (B) layer of the film of the first aspect of the present invention is preferably 0.2 parts by mass or more, more preferably 0.5 parts by mass or more, and still more preferably 1.0 parts by mass or more, and preferably 30 parts by mass or less, more preferably 20 parts by mass or less, and still more preferably 10 parts by mass or less, based on 100 parts by mass of the mixed resin excluding the compatibilizer. If the content of the compatibilizer is in the above range, uniformity of a desired thickness and improvement of the interlayer adhesion strength can be expected, and drastic deterioration of the transparency can be prevented.

(Film of the Second Aspect of the Present Invention)

The film of the second aspect of the present invention is a heat-shrinkable laminated film comprising at least three layers, having an (A) layer, a (C) layer, and a (B) layer between the (A) layer and the (B) layer, the layers comprising the below resin compositions, respectively:

(A) layer: a resin composition comprising a polyester series resin as a main component;

(B) layer: a resin composition comprising a polyester series resin and a polystyrene series resin as main components, wherein a content ratio of the polyester series resin is smaller than a content ratio of the polyester series resin contained in the (A) layer.

(C) layer: a resin composition comprising a polyester series resin and a polystyrene series resin as main components, wherein a content ratio of the polyester series resin is smaller than the content ratio of the polyester series resin contained in the (B) layer.

The polyester series resin and the polystyrene series resin used in any one of the (A) to (C) layers of the film of the second aspect of the present invention may be the same as the polyester series resin used in the (A) layer and the polystyrene series resin used in the (C) layer of the film of the first aspect of the present invention.

<(B) Layer and (C) Layer of the Film of the Second Aspect of the Present Invention>

In the film of the second aspect of the present invention, the (B) layer is made of a resin composition comprising a polyester series resin and a polystyrene series resin as main components, wherein a content ratio of the polyester series resin is smaller than a content ratio of the polyester series resin contained in the (A) layer. Additionally, the (C) layer of the film of the second aspect of the present invention is made of a resin composition comprising a polyester series resin and a polystyrene series resin as main components, wherein a content ratio of the polyester series resin is smaller than the content ratio of the polyester resin contained in the (B) layer.

The content ratio of the polystyrene series resin contained in the (B) layer of the film of the second aspect of the present invention is not particularly limited as long as it does not exceed the range specified in the present invention. However, it is preferably 15 mass % or more, more preferably 20 mass % or more, and still more preferably 25 mass % or more, and preferably 65 mass % or less, more preferably 60 mass % or less, and still more preferably 55 mass % or less, based on the total amount of the resin composition constituting the (B) layer.

The content ratio of the polystyrene series resin contained in the (C) layer of the film of the second aspect of the present invention is not particularly limited as long as it does not exceed the range specified in the present invention. However, it is preferably 50 mass % or more, more preferably 55 mass % or more, and still more preferably 60 mass % or more, and preferably 98 mass % or less, more preferably 97 mass % or less, and still more preferably 96 mass % or less, based on the total amount of the resin composition constituting the (C) layer.

However, when the (B) layer and the (C) layer contain general purpose polystyrene (GPPS), Tg (a peak temperature of the loss elastic modulus E") of the GPPS is very high as around 100° C., a content ratio of the GPPS to be mixed in is preferably mass % or less, more preferably 15 mass % or less, and still more preferably 10 mass % or less, based on the total amount of the resins constituting the (B) layer and the (C) layer.

When the polystyrene series resin contained in the (B) layer and the (C) layer of the film of the second aspect of the present invention is a block copolymer of a styrene series hydrocarbon and a conjugated diene series hydrocarbon, a refractive index ($n_2$) of the block copolymer measured in accordance with JIS K7142 is in a range of preferably ±0.02, and more preferably ±0.015 of a refractive index ($n_1$) of the polyester series resin contained in the (B) layer. In specific, based on a preferable refractive index ($n_1$) of the polyester series resin described above, the refractive index ($n_2$) of the styrene series hydrocarbon-conjugated diene series hydrocarbon block copolymer is preferably 1.540 or more, more preferably 1.550 or more, and still more preferably 1.555 or more, and preferably 1.600 or less, more preferably 1.590 or less, and still more preferably 1.585 or less. By adjusting the difference between the refractive index ($n_2$) of the polystyrene series resin and the refractive index ($n_1$) of the polyester series resin to be in the predetermined range, it is possible to obtain a film having favorable transparency even when the resins are mixed and kneaded to form the film.

The block copolymer of a styrene series hydrocarbon and a conjugated diene series hydrocarbon can be adjusted to substantially have a desired refractive index ($n_2$), through appropriate adjustment of the composition ratio of the styrene series hydrocarbon and the conjugated diene series hydrocarbon. Therefore, it is possible to obtain a refractive index ($n_2$) in the range of ±0.02 of $n_1$ by adjusting the composition ratio of the styrene series hydrocarbon and the conjugated diene series hydrocarbon in consideration of the refractive index ($n_1$) of the polyester series resin used in the (B) layer and the (C) layer. In order to obtain this predetermined refractive index, the block copolymer of a styrene series hydrocarbon and a conjugate diene series hydrocarbon may be adjusted itself, or may be adjusted with two or more kinds of resins mixed in.

On the other hand, in the film of the second aspect of the present invention, the storage elastic modulus (E') at 0° C. of the polystyrene series resin contained in the (B) layer is preferably $1.00\times10^7$ Pa or more, and more preferably $1.50\times10^7$ Pa or more. This storage elastic modulus (E') at 0° C. represents the film stiffness, namely the film rigidity exhibited when the above polystyrene resin is formed into a film of a predetermined thickness. With the storage elastic modulus (E') of $1.00\times10^7$ Pa or more, it is possible to: provide adhesiveness between the (A) layer and the (C) layer when forming the film of the second aspect of the present invention; and inhibit delamination between the (A) layer and the (C) layer when the film is heat-shrunk under a high-temperature atmosphere. More importantly, whitening of the film caused when the film is bent in the processing, that is, whitening on bending can be inhibited, which is thus favorable. This storage elastic modulus (E') can be obtained by using the block copolymer of the styrene series hydrocarbon and the conjugated diene series hydrocarbon alone, by using a mixture of two or more kinds of the copolymer, or by mixing it with other resins in a range that does not deteriorate the transparency.

In cases where a mixed system of the block copolymer of the styrene series hydrocarbon and the conjugated diene series hydrocarbon, or a mixed system of this copolymer and other resins is employed as the polystyrene series resin to be contained in the (B) layer of the film of the second aspect of the present invention, appropriate selection of a copolymer or a resin responsible for rupture-resistance and a copolymer or a resin responsible for stiffness brings about favorable results. In specific, by combining a styrene series hydrocarbon-conjugated diene series hydrocarbon block copolymer having high rupture-resistance with a styrene series hydrocarbon-conjugated diene series hydrocarbon block copolymer having high stiffness, or by mixing a styrene series hydrocarbon-conjugated diene series hydrocarbon block copolymer having high rupture-resistance with other types of resin compositions having high stiffness, it is possible to adjust the total composition of the styrene series hydrocarbon-conjugated diene series hydrocarbon or the mixture thereof with other types of resin, to meet the desired refractive index ($n_2$) and storage elastic modulus (E') at 0° C.

Preferred examples of the styrene series hydrocarbon-conjugated diene series hydrocarbon block copolymer that can provide adhesiveness between the (A) layer and the (C) layer of the film of the second aspect of the present invention, are block SBS and random block SBS. Especially preferred are those having viscoelastic characteristics in which a storage elastic modulus (E') at 0° C. is $1.00\times10^7$ Pa or more and $5.00\times10^9$ Pa or less, and at least one of the peak temperatures of the loss elastic modulus (E") is at 0° C. or less. If the storage elastic modulus (E') at 0° C. is $1.00\times10^7$ Pa or more, it is possible to provide film rigidity by increasing the mixing amount of the resin that gives the film stiffness, when forming the laminated body into the film. On the other hand, regarding the peak temperature of the loss elastic modulus (E"), a temperature on a low-temperature side mainly indicates the rupture-resistance. This property varies depending on the elongation conditions. However, unless the peak temperature of the loss elastic modulus (E") is at 0° C. or less before elongation, the adhesiveness between the (A) layer and the (C) layer may degrade and it may be difficult to provide sufficient rupture-resistance when forming a heat-shrinkable laminated film.

Examples of the resin that can provide stiffness are copolymers formed of a styrene series hydrocarbon having a storage elastic modulus (E') of $2.00\times10^9$ Pa or more at 0° C., such as a block copolymer of a styrene series hydrocarbon and a conjugated diene series hydrocarbon with the block structure thereof controlled, polystyrene, a copolymer of a styrene series hydrocarbon and an aliphatic unsaturated carboxylic acid ester.

An example of the styrene series hydrocarbon-conjugated diene series hydrocarbon block copolymer with the block structure thereof controlled, contained in the (B) layer of the film of the second aspect of the present invention may be SBS having a storage elastic modulus (E') at 0° C. of $2.00\times10^9$ Pa or more as a property of the styrene-butadiene block copolymer. A styrene-butadiene composition ratio (mass %) of SBS to satisfy this is preferably adjusted to be styrene/butadiene=(95 to 80)/(5 to 20), based on 100 mass % of SBS as a whole.

As for the molecular weight of the polystyrene series resin contained in the (B) layer of the film of the second aspect of the present invention, the weight (mass) average molecular weight (Mw) is preferably 100,000 or more and more preferably 150,000 or more, and preferably 500,000 or less, more preferably 400,000 or less, and still more preferably 300,000 or less. If the weight (mass) average molecular weight (Mw) of the polystyrene series resin is 100,000 or more, problems such as deterioration of the film do not occur, which is thus favorable. Moreover, if the weight (mass) average molecular weight (Mw) of the styrene series resin composition is 500,000 or less, it is unnecessary to adjust the flow property thereof and problems such as degradation of extrusion performance do not occur, which is thus favorable.

In a case of employing a copolymer of a styrene series hydrocarbon and an aliphatic unsaturated carboxylic acid ester as the polystyrene series resin in the (B) layer of the film of the second aspect of the present invention, examples of the aliphatic unsaturated carboxylic acid ester to be copolymerized with the styrene series hydrocarbon may be methyl (meth)acrylate, butyl (meth)acrylate, 2-ethylhexyl (meth)acrylate, lauryl (meth)acrylate, and stearyl (meth) acrylate. A preferred example is a copolymer of styrene and butyl (meth)acrylate; and a more preferred is a copolymer in which: the amount of styrene is in a range of 70 mass % or more and 90 mass % or less, Tg (a peak temperature of the loss elastic modulus E") is 50° C. or more and 90° C. or less, and the melt flow rate (MFR) measurement (measurement conditions: temperature 200° C.; load 49 N) is 2 g/10 min or more and 15 g/10 min or less. It should be noted that (meth)acrylate mentioned above indicates acrylate and/or methacrylate.

The resin compositions to be contained in the (B) layer and the (C) layer of the film of the second aspect of the present invention are not particularly limited as long as they do not exceed the range specified in the present invention. However, a resin composition other than the polyester series resin and the polystyrene series resin may also be mixed in. Examples of such a resin composition include: compatibilizers to facilitate compatibility between a polyester series resin and a polystyrene series resin; polyolefin series resin compositions, acrylic resin compositions, and polycarbonate resin compositions. Among them, the compatibilizers are preferably contained.

When the compatibilizer is contained in the (B) layer and the (C) layer of the film of the second aspect of the present invention, dispersibility of the polyester series resin or the polystyrene series resin can be improved, therefore enabling increase in the film transparency and uniformity in the thickness, which is thus favorable in view of improving productivity. Furthermore, the interlayer adhesion strength can be improved by use of the compatibilizer.

An example of the compatibilizer to be contained in the (B) layer and the (C) layer of the film of the second aspect of the present invention may be a styrene series block copolymer or graft copolymer which has a polar group having high affinity with the polyester series resin contained in the (B) layer or has a polar group that can react with the polyester series resin, and which also has a portion being compatible with or having high affinity with the polystyrene series resin contained in the (B) layer and the (C) layer. Specific examples of the polar group having high affinity with a polyester series resin or the functional group that can react therewith include an acid anhydride group, a carboxylic acid group, a carboxylic acid ester group, a carboxylic acid chloride group, a carboxylic acid amide group, a carboxylate group, a sulfonic acid group, a sulfonic acid ester group, a sulfonic acid chloride group, a sulfonic acid amide group, a sulfonate group, an epoxy group, an amino group, an imide group, and an oxazoline group. Among these, an acid anhydride group, a carboxylic acid group, a carboxylic acid ester group, and an oxazoline group are preferred.

The expression "has a portion being compatible with the polystyrene series resin" means "having a chain in affinity with the polystyrene series resin. Specific examples include random copolymers having a styrene chain, a styrene series copolymer segment etc. as a main chain, a block chain, or a graft chain, or having a styrene series monomer unit.

Based on the above viewpoints, the compatibilizer is preferably at least one selected from (a) to (e) below:

(a) an oxazoline group-containing styrene series copolymer;

(b) a styrene-maleic anhydride copolymer;

(c) a polyester series elastomer or a modified polyester series elastomer;

(d) a polystyrene series elastomer or a modified polystyrene series elastomer;

(e) a resin composition being a graft copolymer having a stem component and a branch component different from each other, wherein the stem component or the branch component of the graft copolymer is formed of a polyester series resin or a polystyrene series resin.

Examples of commercially available products of the oxazoline group-containing styrene series copolymer include EPOCROS (produced by Nippon Shokubai Co. Ltd.).

Examples of commercially available products of the styrene-maleic anhydride copolymer include: Dylark series (produced by NOVA Chemicals); and Xiran series (produced by Polyscope).

Examples of commercially available products of the polyester series elastomer or the modified polyester series elastomer include: PRIMALLOY (produced by Mitsubishi Chemical Corporation); Pelprene (produced by TOYOBO CO., LTD.); Hytrel (produced by Toray-Du Pont); VYLON (produced by TOYOBO CO., LTD.); and Polyester (produced by The Nippon Synthetic Chemical Industry Co., Ltd.).

Examples of commercially available products of the polystyrene series elastomer or the modified polystyrene series elastomer include: Dynalon (produced by JSR Corporation); Toughtec (produced by Asahi Chemicals Corporation); and Hybrar, Septon (produced by Kuraray Co., Ltd.).

Examples of commercially available products of the resin composition being a graft copolymer having a stem component and a branch component different from each other, wherein the stem component or the branch component of the graft copolymer is formed of a polyester series resin or a polystyrene series resin, include: Modiper (produced by NOF CORPORATION Chemical Division); RESEDA (produced by Toagosei Co. Ltd.); and VMX (produced by Mitsubishi Chemical Corporation).

A content ratio of the compatibilizer in the (B) layer and the (C) layer of the film of the second aspect of the present invention is not particularly limited as long as it does not exceed the range specified in the present invention. However, it is preferably 1 mass % or more, more preferably 3 mass % or more, and still more preferably 5 mass % or more, and preferably 40 mass % or less, more preferably 35 mass % or less, and still more preferably 30 mass % or less, based on 100 mass % of the resin composition constituting the (B) layer. If the content ratio of the compatibilizer is in the above range, uniformity of the desired thickness and improvement of the interlayer adhesion strength can be expected, and drastic deterioration of the transparency can be prevented.

<Additives to Each Layer>

In the films of the first and the second aspects of the present invention, a plasticizer and/or a tackifier resin may be contained in each layer, in addition to the components described above, in a range not drastically degrading the advantageous effects of the films of the first and the second aspects of the present invention, for the purpose of improving and adjusting the formability, productivity, and various properties of the heat-shrinkable films, with a content ratio thereof being preferably 1 mass % or more, more preferably 2 mass % or more, and still more preferably 3 mass % or more, and preferably mass % or less, more preferably 8 mass % or less, and still more preferably 5 mass % or less, based on the total amount of the resins constituting each layer. If the content ratio of the plasticizer and/or the tackifier resin to the total amount of the resins is 10 mass % or less, degradation of the melt viscosity and of thermal adhesiveness-resistance is suppressed and natural shrinkage is unlikely to occur. Other than the plasticizer and the tackifier resin, various kinds of additives may be adequately added to the film of the first aspect of the present invention depending on the purpose of use, examples of the additive including an ultraviolet absorber, a light stabilizer, an antioxidizing agent, a stabilizer, a coloring agent, an antistatic agent, a lubricant, and an inorganic filler.

<Layer Configuration of Film>

The layer configuration of the films of the first and the second aspects of the present invention is not particularly limited as long as the films comprise at least three layers, which are the (A) layer, the (B) layer, and the (C) layer. A preferred laminate configuration of the films of the first and the second aspects of the present invention is a five-layer structure having three kinds of layers, which is (the (A) layer)/(the (B) layer/(the (C) layer)/(the (B) layer)/(the (A) layer) with the (A) layer as the outermost layer. With this layer configuration, it is possible to obtain, with high productivity and high economic efficiency, a heat-shrinkable laminated film having a favorable film shrinkage property with the interlayer peeling of the film inhibited, which is an object of the present invention, and being suitable for shrink packaging, shrink bond-packaging, shrinkable label, and so on.

Next, the a five-layer structure with three kinds of layers being (the (A) layer)/(the (B) layer/(the (C) layer)/(the (B) layer)/(the (A) layer), which is a preferred embodiment of the films of the first and the second aspects of the present invention will be described.

In the film of the first aspect of the present invention, a thickness ratio between the (A) layer and the (C) layer is set such that when the thickness of the (A) layer is 1, the thickness of the (C) layer is preferably 1 or more, more preferably 1.5 or more, and still more preferably 2 or more, and preferably 10 or less, more preferably 8 or less, and still more preferably 6 or less. Additionally, the thickness of the (B) layer is preferably 10% or more and more preferably 15% or more, and preferably 300% or less, more preferably 200% or less, and still more preferably 100% or less, of the total thickness of the (A) layer. If the thickness of the (B) layer is 10% or more of the total thickness of the (A) layer, a favorable adhesion effect can be attained; and if it is 100% or less, that is, if it is not larger than the total thickness of the (A) layer, the transparency of the film will not degrade drastically.

In the film of the second aspect of the present invention, a thickness ratio between the (A) layer and the (C) layer is set such that when the thickness of the (A) layer is 1, the thickness of the (C) layer is preferably 2 or more, more preferably 3 or more, and still more preferably 4 or more, and preferably 12 or less, more preferably 10 or less, and still more preferably 8 or less. Additionally, the thickness of the (B) layer is preferably 10% or more and more preferably 15% or more, and preferably 150% or less, more preferably 100% or less, and still more preferably 80% or less, of the total thickness of the (A) layer. If the thickness of the (B) layer is 10% or more of the total thickness of the (A) layer, a favorable adhesion effect can be attained; and if it is 150% or less, that is, if it is not more than 1.5 times of the total thickness of the (A) layer, the transparency of the film will not degrade drastically.

The total thickness of the film of the first aspect and the total thickness of the second aspect of the present invention are not particularly limited; however, it is preferable for the films to be thin in order to reduce costs of source materials to as low as possible. In specific, the thickness after elongation is preferably 60 μm or less, more preferably 55 μm or less, still more preferably 50 μm or less, and most preferably 45 μm or less.

<Shrinkage Property>

A heat shrinkage ratio of the films of the first and the second aspects of the present invention is preferably 5% or less, more preferably 3% or less, and still more preferably 1% or less in at least one direction, when the films are dipped in hot water of 50° C. for 10 seconds. Further, a heat shrinkage ratio of the films of the first and the second aspects of the present invention is preferably 10% or more and less than 30%, more preferably 10% or more and 25% or less, and still more preferably 10% or more and 20% or less, in at least one direction when the films are dipped in hot water of 70° C. for 10 seconds. Furthermore, a heat shrinkage ratio of the films of the first and the second aspects of the present invention is preferably 20% or more, more preferably 30% or more, still more preferably 35% or more, and especially preferably 40% or more, and preferably 70% or less, more preferably 60% or less, and still more preferably 50% or less, in at least one direction when the films are dipped in hot water of 80° C. for 10 seconds.

In this description, "at least one direction" means a main shrinking direction or a direction orthogonal to the main shrinking direction, or means both of these directions; and usually refers to the main shrinking direction. Herein, the "main shrinking direction" refers to a direction in which elongation of the film is the larger of the longitudinal direction and the transverse direction of the film; and is for example a direction equivalent to an outer circumferential direction of a bottle when the film is fitted around the bottle.

It is seen that if the heat shrinkage ratio at the time of dipping the film in hot water of 50° C. is more than 5%, there is a high possibility of a large natural shrinkage ratio of the film, resulting in constriction of the film when the film is kept in a roll, or a poor appearance with misaligned end faces of the film roll.

Further, if the heat shrinkage ratio in the main shrinking direction is less than 10% at around 70° C., the heat-shrinkage force becomes small. Therefore, when such a heat-shrinkable laminated film is used as a label for a container for example, it cannot be held temporarily onto the container, and therefore may move upward to the upper face of the container under high temperature. In contrast, if the heat shrinkage ratio in the main shrinking direction is more than 30% at around 70° C., heat shrinkage of the film occurs dramatically in a low-temperature region and therefore the film may not be able to be heat-shrunk at a predetermined position. On the other hand, if the heat shrinkage ratio in the main shrinking direction at around 80° C. is less than 20%, heat shrinkage of the film at the neck portion or on the upper face of the container becomes insufficient. Therefore, the heat shrinkage ratio in the main shrinking direction at around 80° C. is preferably 20% or more, more preferably 30% or more, still more preferably 40% or more, and especially preferably 50% or more.

Accordingly, if the heat shrinkage ratio of the film in at least one direction at the time of dipping the film in hot water of 70° C. and 80° C. for ten seconds is within the above range, a laminated film will have heat shrinkability that allows it to be held temporarily onto the container in the low-temperature region around 70° C., and will shrink dramatically in the high-temperature region around 80° C. over 70° C. As a result, uniform shrinkage and an excellent shrink finishing quality can be attained at a predetermined position without such defects as wrinkles and pocks not only on the body part of the container but also on the neck part, which is far thinner than the body part, and on upper face of the container.

If the films of the first and the second aspects of the present invention are used as a label for PET containers, a heat shrinkage ratio of the film in the orthogonal direction (the direction orthogonal to the main shrinking direction) is preferably 20% or less, more preferably 10% or less, and still more preferably 8% or less when the film is dipped in hot water of 80° C. for 10 seconds. Further, a heat shrinkage ratio of the film in the orthogonal direction is preferably 10% or less, more preferably 5% or less, and still more preferably 3% or less when the film is dipped in hot water of 70° C. for 10 seconds. If the heat shrinkage ratio in the orthogonal direction exceeds 10%, shrinkage of the film in the top-bottom direction becomes significant after the shrinkage in a case of being employed as a label, thus likely causing dimensional misalignment or problems on its appearance.

<Transparency>

The transparency of the film of the second aspect of the present invention is evaluated in terms of a haze value measured in accordance with JIS K7105; and the haze is preferably 10% or less, more preferably 8% or less, and still more preferably 5% or less. If the haze is 10% or less, favorable transparency of the film can be attained, enabling excellent printing.

<Interlayer Peeling Strength>

In the film of the second aspect of the present invention, the interlayer peeling strength is preferably 1 N/15 mm width or more, more preferably 1.5 N/15 mm width or more, and still more preferably 2 N/15 mm width or more, when: the heat-shrinkable laminated film is cut to obtain a test piece in a size of 150 mm in the main shrinking direction and 15 mm in the direction orthogonal to the main shrinking direction; a part of the (A) layer is peeled from an edge of this test piece in the main shrinking direction to form a peeled portion of the (A) layer and a portion on the (C) layer side from which the part of the (A) layer is peeled apart; and the peeled portion on the (A) layer side and the portion on the (C) layer side from which the part of the (A) layer is peeled apart are sandwiched by a chuck of a tensile testing machine to conduct a 180-degree peel test at a test speed of 100 mm/min with respect to the main shrinking direction. Since the film of the second aspect of the present invention has an interlayer peeling strength of 1 N/15 mm width or more, there will not occur such troubles as interlayer peeling due to vibration during transportation or scratching by a hand nail.

<Misalignment Width in Overlapping Portion>

Next, a misalignment width in an overlapping portion of the films of the first and the second aspects of the present invention will be described with reference to the drawings.

Figure 2:
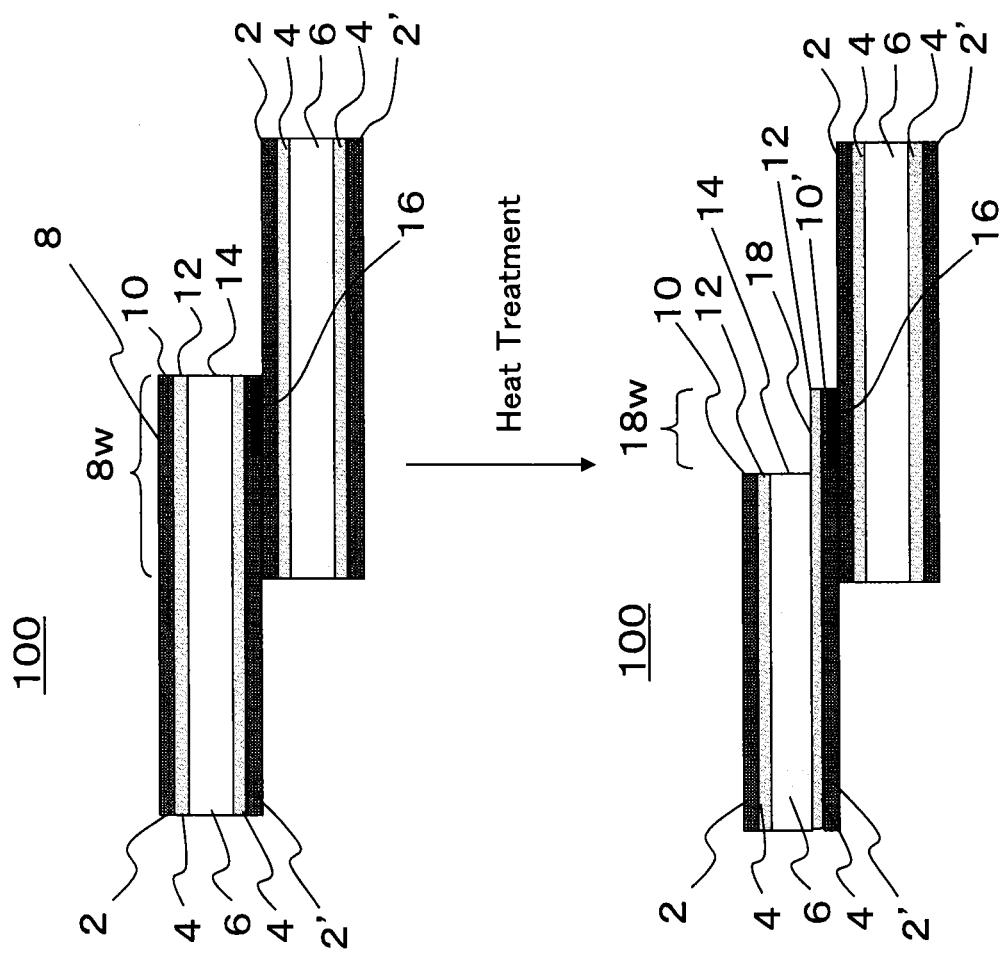
FIG. 2 is a cross-sectional view (Part 2) of the film showing the vicinity of the overlapping portion in a preferable embodiment of the film of the present invention.
Figure 3:
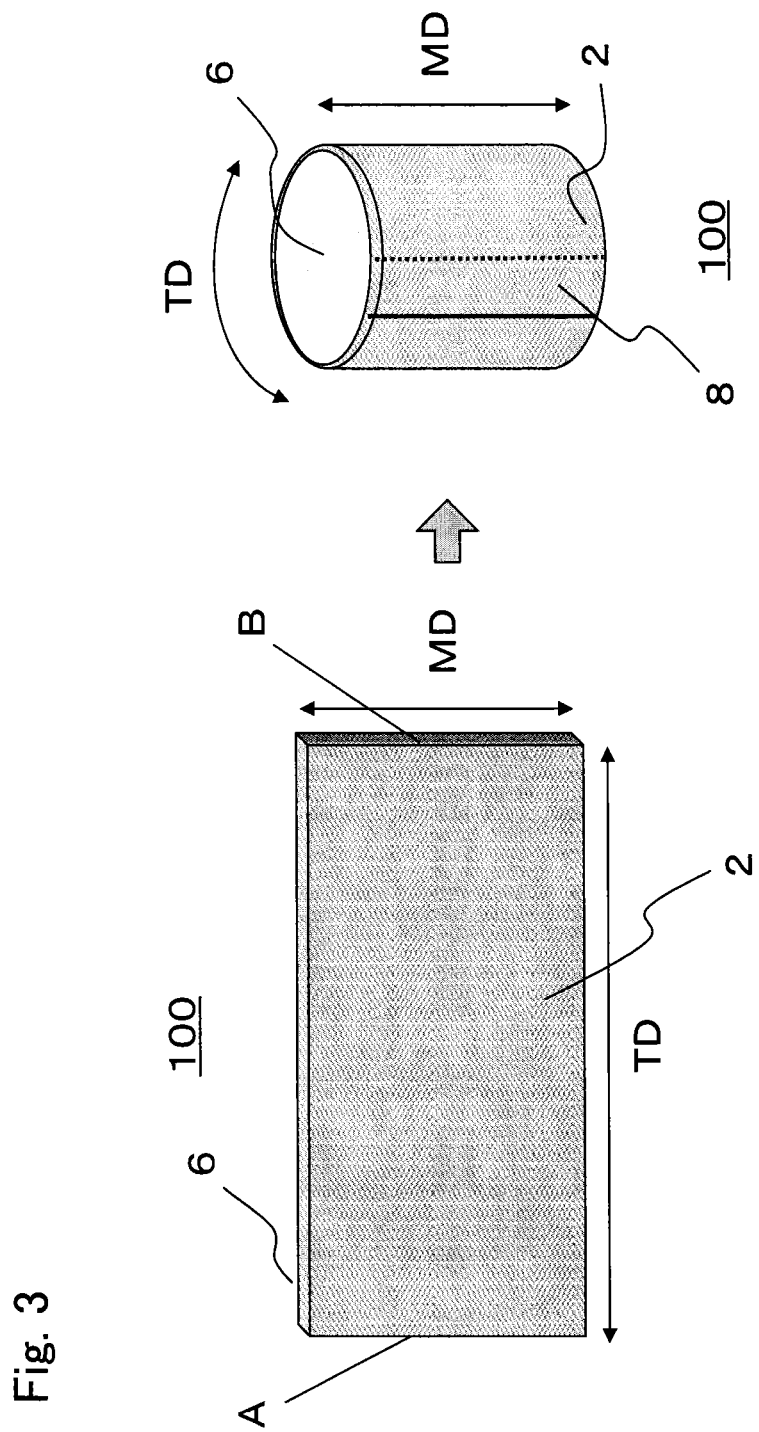
FIG. 3 is a view illustrating a state in which the overlapping portion in the preferable embodiment of the film of the present invention is formed.

In FIGS. 1 to 3, the reference numeral 100 indicates a film piece of the first aspect or the second aspect of the present invention; the reference numeral 2 indicates an (A) layer (front layer); the reference numeral 2' indicates an (A) layer (back layer); the reference numeral 4 indicates a (B) layer; the reference numeral 6 indicates a (C) layer; the reference numeral 8 indicates an overlapping portion; the reference numeral 8w indicates an overlapping width; the reference numeral 10 indicates an edge of the (A) layer (front layer) 2; the reference numeral 10' indicates an edge of the (A) layer (back layer) 2'; the reference numeral 12 indicates an edge of the (B) layer 4; the reference numeral 14 indicates an edge of the (C) layer 6; the reference numeral 16 indicates a sealed portion; the reference numeral 18 indicates misalignment; the reference numeral 18w indicates a misalignment width; the reference symbol A indicates one end side; and the reference symbol B indicates the other end side.

FIGS. 1 and 2 respectively show a preferred embodiment of the first and the second aspects of the present invention. FIGS. 1 and 2 are cross-sectional views in the vicinity of overlapping portion 8 of the film having the (A) layer (front layer) 2, the (B) layer 4, the (C) layer 6, the (B) layer 4, the (A) layer (back layer) 2' laminated in the mentioned order from the upper side. Additionally, the upper part of FIGS. 1 and 2 shows a state before a heat treatment; and the lower part of FIGS. 1 and 2 shows a state having misalignment between the edge 10' of the (A) layer (back layer) 2' of the film and the edge 12 of the (B) layer 4 of the film, or misalignment between the edge 10' of the (A) layer (back layer) 2' as well as the edge 12 of the (B) layer 4 and the edge 14 of the (C) layer 6, in the overlapping portion after the heat treatment. The left part of FIG. 3 shows a rectangular film piece 100 obtained by cutting the film into a size of 110 mm in the drawing direction (MD (Machine Direction)) and 235 mm in a direction orthogonal thereto. The right part of FIG. 3 illustrates a state in which: a portion of the (A) layer (front layer face or back layer face) on one end side A of the film piece 100 in the drawing direction (MD) and a portion of the (A) layer (front layer face or back layer face) on the other end side B of the film piece 100 in the drawing direction (MD) are sealed with each other in manner parallel with the drawing direction (MD); and thereby a 2 to 7 mm-wide overlapping portion 8 is formed over the laminated film.

As shown in FIG. 3, the rectangular film piece 100 is obtained by cutting a roll of the film of the first aspect or the second aspect of the present invention into a size of 110 mm in the drawing direction (MD) and 235 mm in the direction orthogonal thereto. Then, a portion of the surface of the (A) layer (front layer) 2 on one end side A of the film piece 100 in MD and a portion of the surface of the (A) layer (back layer) 2' on the other end side B of the film piece in MD are sealed with each other in a manner parallel with MD, and thereby a cylindrical film having a 2 to 7 mm-wide overlapping portion 8 is formed. Subsequently, this cylindrical film is heat-treated at 99° C. In the films of the first and the second aspects of the present invention, the expression, "heat-treated at 99° C." means a state where the film, which is fitted around a 350 ml square-shaped PET bottle, is dipped into hot water of 99° C. for 10 seconds.

When the films of the first and the second aspects of the present invention are returned to room temperate after heat-treated at 99° C., the misalignment width 18w of the misalignment 18 between the edge 10' of the (A) layer (back layer) 2' in MD and the edge 12 of the (B) layer 4 in MD that are sealed at the overlapping portion 8, or the misalignment width 18w of the misalignment 18 between the edge 10' of the (A) layer (back layer) 2' in MD as well as the edge 12 of the (B) layer 4 in MD, and the edge 14 of the (C) layer 6 in MD that are sealed at the overlapping portion 8, is not more than 5% of the overlapping width 8w of the overlapping portion 8.

FIG. 1 shows a first configuration of the misalignment 18 of the films of the first and the second aspects of the present invention. FIG. 1 shows a state (the lower part in FIG. 1) in which there is misalignment 18 between the edge 10' of the (A) layer (back layer) 2' in the drawing direction (MD) and the edge 12 of the (B) layer 4 that are sealed with each other at the overlapping portion 8 when the cylindrical film formed of the film 100 of the first aspect and of the second aspect of the present invention having a sealed portion in the overlapping portion 8 (the upper part in FIG. 1) is returned to room temperature after heat-treated at 99° C.

Additionally, FIG. 2 shows a second configuration of the misalignment 18 of the films of the first and the second aspects of the present invention. FIG. 2 shows a state (the lower part in FIG. 2) in which there is misalignment 18 between the edge 10' of the (A) layer (back layer) 2' as well as the edge 12 of the (B) layer 4 in the drawing direction (MD) and the edge 14 of the (C) layer 6 that are sealed with each other at the overlapping portion 8 when the cylindrical film formed of the film 100 of the first aspect and of the second aspect of the present invention having a sealed portion in the overlapping portion 8 (the upper part in FIG. 2) is returned to room temperature after heat-treated at 99° C. In these cases, the misalignment width 18w is not more than 5% of the overlapping width 8w of the overlapping portion 8.

Conventional heat-shrinkable laminated films having an (A) layer (front and back layers) made of a polyester series resin have drawbacks that when they are heat-treated, there occurs peeling between the (A) layer (front and back layers) and a (B) layer (adhesive layer), or peeling between the (A) layer (front and back layers) as well as the (B) layer (adhesive layer) and a (C) layer (middle layer), resulting in an unpleasant appearance. By contrast, the films of the first and the second aspects of the present invention hardly suffer peeling between the (A) layer (front and back layers) and the (B) layer (adhesive layer), or peeling between the (A) layer (front and back layers) as well as the (B) layer (adhesive layer) and the (C) layer (middle layer) even when heat-treated, and therefore can have an excellent appearance.

In the films of the first and the second aspects of the present invention, the easiness of peeling can be indicated by misalignment caused between the (A) layer (front and back layers) and the (B) layer (adhesive layer), or between the (B) layer (adhesive layer) and the (C) layer (middle layer) after sealing of the layers. Namely, in the films of the first and the second aspects of the present invention, the misalignment width between the end face of the (A) layer (back layer) or the surface (back face) of the (A) layer in the drawing direction (MD) and the end face of the (B) layer (adhesive layer) in the drawing direction (MD), or the misalignment width between the end faces of the (A) layer (back layer) or the (A) layer (front layer) as well as the (B) layer (adhesive layer) in the drawing direction (MD) and the end face of the (C) layer (middle layer) in the drawing direction (MD) that are sealed in the overlapping portion is not more than 5%, preferably not more than 3%, and still more preferably not more than 2% of the overlapping width of the overlapping portion, when the films are heat-treated and thereafter returned to room temperature. If the misalignment in the overlapping portion after the heat treatment is not more than 5%, there will not be peeling between the (A) layers on one side (front/back layer) and the (B) layer (adhesive layer), or between the (B) layer (adhesive layer) and the (C) layer (middle layer), thereby enabling the film to maintain an excellent appearance.

The above overlapping portion is where a portion of a surface of the (A) layer (front/back layer) on one end side in the drawing direction (MD) and a portion of a surface of the (A) layer (front/back layer) on the other end side in the drawing direction (MD) are sealed in a manner parallel with the drawing direction (MD) to overlap with each other in a width of 2 to 7 mm on the heat-shrinkable laminated film. Examples of a solvent used to seal the portion of the (A) layer (front layer or back layer) on one end side and the portion of the (A) layer (back layer or front layer) on the other end side include: pentane; n-hexane; diethyl ether; heptane; octane; cyclohexane; isopropyl acetate; n-butyl acetate; n-propyl acetate; carbon tetrachloride; xylene; ethyl acetate; toluene; benzene; methyl methyl ketone; methyl acetate; methylene chloride; tetrahydrofuran; dioxolan; acetone; isopropanol; ethanol; methanol; and a mixed solvent made of at least two solvents selected from these. Further, a width of the overlapping portion is at least 2 mm, preferably 3 mm or more, and 7 mm or less, preferably 5 mm or less.

<Whitening on Bending>

In the film of the second aspect of the present invention, it is possible to inhibit whitening in a bent portion thereof, which is caused when cutting a heat-shrinkable laminated film into a test piece in a size of 100 mm in the main shrinking direction and 200 mm in the direction orthogonal to the main shrinking direction, bending the test piece into a size of 50 mm in the main shrinking direction and 200 mm in the direction orthogonal to the main shrinking direction in a line symmetry, with the direction orthogonal to the main shrinking direction as an axis, and thereafter opening the bent film back into the original size. This advantageous effect can be attained by adjusting the film of the second aspect of the present invention to be in the range specified in the present invention.

The mechanism of causing whitening in a bent portion is unclear; however, cracks or voids generated in the bent portion are assumed to be the cause of the whitening. The film of the second aspect of the present invention is a heat-shrinkable laminated film which has the (B) layer mainly composed of a mixed resin composition of a polyester series resin and a polystyrene series resin, is manufactured by elongating, in at least one direction, a film comprising at least three layers that are the (A) layer, the (B) layer, and the (C) layer, and has a heat shrinkage ratio of 20% or more in the main shrinking direction when dipped in hot water of 80° C. for 10 seconds. Accordingly, cracks or voids generated in the bent portion can be made small in the film of the second aspect of the present invention by shrinkage of the layer (including the adhesive layer) around the cracks or the voids even when the film is bent with strong bending pressure. As a result, whitening in the bent portion is hardly seen even when the film of the second aspect of the present invention is shrunk and fitted onto a container or the like.

(Method for Manufacturing the Films of the First and the Second Aspects of the Present Invention)

The films of the first and the second aspects of the present invention are obtained by: laminating simultaneously or sequentially the (C) layer as a middle layer, the (A) layers as front and back layers to be respectively disposed on each face of the (C) layer, and a (B) layer as an adhesive layer to be formed between the (C) layer and the (A) layer, thereby making a laminated film; thereafter heating the laminated film; and elongating it at least in a monoaxial direction.

The above laminated film can have the middle layer, the front and back layers, and the adhesive layer formed simultaneously by co-extrusion thereof using an extruder having a T-die by known methods such as a T-die method and a tubular method. Additionally, the laminated film can be made by separately forming the resins constituting each layer into a sheet shape and thereafter laminating them sequentially by a pressing method, a roll nipping method or the like.

The laminated film is cooled by a cooling roll, air, water, or the like, thereafter reheated by appropriate means such as hot air, hot water, and infrared ray, and elongated monoaxially or biaxially in a simultaneous or sequential manner by such methods as a roll stretching method, a tenter stretching method, a tubular stretching method, and a long-distance stretching method. In elongating the film, the elongation may be performed in MD and TD simultaneously. However, sequential biaxial elongation is effective, wherein either MD elongation or TD direction is carried out first. It does not matter which of the MD elongation and the TD elongation is to be carried out first. An elongation temperature needs to be changed in accordance with the softening temperature of the resin constituting the film or the applications of the heat-shrinkable laminated film; however, it is controlled to be in a range of preferably 60° C. and more preferably 70° C. or more, and preferably 130° C. or less and more preferably 120° C. or less. An elongation magnification in the main shrinking direction (TD) is adequately determined in a range of preferably twice or more, more preferably three times or more, and still more preferably four times or more and preferably 7 times or less, and more preferably six times or less, depending on components of the film, an elongation method, an elongation temperature, and an intended product configuration. Additionally, selection between the monoaxial elongation and the biaxial elongation is adequately determined in accordance with the use of an intended product.

Even in an application that requires a substantially one-direction shrinkage property as in labels for PET-made containers, it is also effective to elongate the film in a direction perpendicular thereto in a range not deteriorating the shrinkage property. The elongation temperature thereof, which also depends on components other than PET, is usually in a range of 60° C. or more and 90° C. or less. Furthermore, although the rupture-resistance of the film improves as the size of the film becomes larger; however it causes increase in the heat shrinkage ratio, making it difficult to achieve a favorable shrink finishing quality. Therefore, the elongation magnification thereof is preferably 1.03 times or more and 1.5 times or less.

The films of the first and the second aspects of the present invention can maintain shrinkability provided thereto, by being cooled promptly before a molecular orientation of the elongated film is released after the elongation.

[Molded Product, Heat-shrinkable Label, and Container]

The films of the first and the second aspects of the present invention can be used as various kinds of molded products such as covering films, banding bands, and exterior films, by being shaped or having a printed layer, a deposited layer, or other functional layers formed depending on the needs. Especially, the films of the present invention can be used as heat-shrinkable labels for food containers (for example, PET bottles, glass bottles for soft drinks or foods, preferably PET bottles), and can also be used for containers having complicated shapes (e.g. cylinders with a central portion thereof narrowed; quadrangular prisms, pentagonal prisms, and hexagonal prisms having corners, etc.).

Further, the films of the first and the second aspects of the present invention can be used not only as materials of heat-shrinkable labels for plastic molded products that deform when heated to high temperature, but also as materials of heat-shrinkable labels for packaging products (containers) that are made of materials having a thermal expansion coefficient, a water-absorbing property and the like that are largely different from those of the films of the present invention, for example made of at least one selected from: metals; porcelains; glasses; papers; polyolefin series resins such as polyethylene, polypropylene, and polybutene; polymethacrylate series resins, polycarbonate series resins; polyester series resins such as polyethylene terephthalate and polybutylene terephthalate; and polyamide resins.

Examples of the constituent materials of plastic packaging products that can use the films of the first and the second aspects of the present invention include not only the above mentioned resins, but also polystyrene, rubber-modified high-impact polystyrene (HIPS), a styrene-butyl acrylate copolymer, a styrene-acrylonitrile copolymer, a styrene-maleic anhydride copolymer, an acrylonitrile-butadiene-styrene copolymer (ABS), a (meth)acrylic acid-butadiene-styrene copolymer (MBS), polyvinyl chloride series resins, phenolic resins, urea resins, melamine resins, epoxy resins, unsaturated polyester resins, and silicone resins. The plastic packaging products may be made of a mixture of two or more kinds of resins or a laminated body thereof.

EXAMPLES

Examples of the heat-shrinkable laminated film, the heat-shrinkable label, and the container having the label fitted thereon of the present invention will be described hereinafter; however, the present invention is not limited to these Examples.

Measurement values and evaluation in the Examples are determined as follows. In the Examples, a drawing (flow) direction of the laminated film is indicated as "MD (Machine Direction)", and a direction orthogonal thereto is indicated as "TD (Transverse Direction)".

<Measurement Method>

(1) Heat Shrinkage Ratio

In the case of the film of the first aspect of the present invention, a heat-shrinkable laminated film obtained was cut into a size of 100 mm in MD and 100 mm in TD; film pieces obtained thereby were dipped in a hot water bath of 70° C. and 80° C. for 10 seconds; then, the amount of shrinkage thereof in TD was measured.

On the other hand, in the case of the film of the second aspect of the present invention, a heat-shrinkable laminated film obtained was cut into a size of 20 mm in MD and 100 mm in TD; film pieces obtained thereby were dipped in a hot water bath of 80° C. for 10 seconds; then, the amount of shrinkage thereof in TD was measured.

The heat shrinkage ratio is indicated by a ratio of the shrinkage amount to the original dimension before shrinkage, the ratio being represented in percentage.

(2) Evaluation of Interlayer Peeling

With regard to the film of the first aspect of the present invention, a heat-shrinkable laminated film obtained was cut to have a width of 235 mm in TD. A bag-making machine was used to: overlap portions of 10 mm at both ends of the film in TD with each other; seal 5 mm in width of the edges of the film by using various solvents; and thereby make a cylindrical film. This cylindrical film was cut to have a size of 110 mm in MD (the direction orthogonal to the TD direction), fitted around a square-shaped PET bottle having a capacity of 350 ml, dipped in hot water of 99° C. for 10 seconds, and thereafter returned to room temperature. After fitting the film around the bottle, evaluation of the film was made based on the below criteria.

Excellent: a misalignment width in the edge of the fitted label was 0% or more and less than 2% of the overlapping width of the overlapping portion of the film;
Good: a misalignment width in the edge of the fitted label was 2% or more and 5% or less of the overlapping width of the overlapping portion of the film;
Poor: a misalignment width in the edge of the fitted label is more than 5% of the overlapping width of the overlapping portion of the film, and an outer layer and an inner layer of the fitted label were peeled apart.

With regard to the film of the second aspect of the present invention, a heat-shrinkable laminated film obtained was cut into a test piece having a size of 150 mm in the main shrinking direction and 15 mm in the direction orthogonal to the main shrinking direction; thereafter a part of the (A) layer was peeled from an edge of this test piece in the main shrinking direction, to create a peeled portion on the (A) layer side and to create a portion from which the part of the (A) layer is peeled apart, on the (C) layer side; and the peeled portion on the (A) layer side and the portion on the (C) layer side from which the part of the (A) layer is peeled apart are sandwiched by a chuck of a tensile testing machine, to conduct a 180-degree peel test at a test speed of 100 mm/min with respect to the main shrinking direction. An average value at which a load shown in the peel test became constant to a certain level was used to evaluate the interlayer peeling strength.

Excellent: the interlayer peeling strength was 2 N/15 mm width or more;
Good: the interlayer peeling strength was 1 N/15 mm width or more and less than 2 N/15 mm width;
Poor: the interlayer peeling strength was less than 1 N/15 mm width.

(3) Transparency

A haze value of the film of the second aspect of the present invention having a thickness of 40 μm was measured in accordance with JIS K7105, to evaluate the transparency of the film.

Excellent: a haze of less than 5%;
Good: a haze of 5% or more and less than 8%;
Average: a haze of 8% or more and 10% or less;
Poor: a haze of over 10%

(4) Evaluation of Delamination in High-Temperature Treatment

The film of the second aspect of the present invention obtained was cut to have a width of 235 mm in TD. A bag-making machine was used to: overlap 10 mm of both ends of the film in TD with each other; seal 5 mm in width of the end faces of the film by using a solvent made by mixing tetrahydrofuran/cyclohexane at 75/25 in volume fraction; and thereby make a cylindrical film. This cylindrical film was cut to have 110 mm in MD (the direction orthogonal to the TD direction), fitted onto a square-shaped PET bottle having a capacity of 350 ml, dipped in hot water of 99° C. for 10 seconds, and thereafter returned to room temperature. After covering the bottle with the film, evaluation of the film was made based on the below criteria.

Excellent: a misalignment width in the end face of the fitted label was 0% or more and less than 2% of the overlapping width of the overlapping portion of the film;
Good: a misalignment width in the end face of the fitted label was 2% or more and 5% or less of the overlapping width of the overlapping portion of the film;
Poor: a misalignment width in the end face of the fitted label is more than 5% of the overlapping width of the overlapping portion of the film, and an outer layer and an inner layer of the fitted label were peeled apart.

(5) Evaluation of Whitening on Bending

The film of the second aspect of the present invention obtained was cut into a test piece having a size of 100 mm in the main shrinking direction and 200 mm in the direction orthogonal to the main shrinking direction; thereafter, the test piece was bent in a line symmetry with an axis in the direction orthogonal to the main shrinking direction, into a size of 50 mm in the main shrinking direction and 200 mm in the direction orthogonal to the main shrinking direction, thereby having a bent portion formed thereon; then the bent test piece was opened to be back into the original size of 100 mm in the main shrinking direction and 200 mm in the direction orthogonal to the main shrinking direction. At this time, occurrence of whitening in the bent portion was checked and evaluated based on the below criteria.

Good: a bent mark remained in the bent portion of the film, but the bent portion was not whitened;
Poor: a clear whitened line remained in the bent portion of the film.

In addition, the source materials used in each of the Examples and the Comparative Examples are as follows.

(Polyester Series Resin)

(1) Hard Polyester Resin A: a copolyester formed of 100 mole % of terephthalic acid as a dicarboxylic acid component, and 65 mole % of ethylene glycol, 32 mole % of 1,4-cyclohexanedimethanol, and 2 mole % of diethylene glycol as glycol components; storage elastic modulus E' at 30° C.=1.9×10$^9$ Pa; hereinafter abbreviated as "hard PEs-A".

(2) Hard Polyester Series Resin B: a copolyester formed of 100 mole % of terephthalic acid as a dicarboxylic acid component, and 65 mole % of ethylene glycol, 23 mole % of 1,4-cyclohexanedimethanol, and 12 mole % of diethylene glycol as glycol components; storage elastic modulus E' at 30° C.=1.8×10$^9$ Pa; hereinafter abbreviated as "hard PEs-B".

(3) Hard Polyester Series Resin C: a copolyester formed of 90 mole % of terephthalic acid and 10 mole % of isophthalic acid as dicarboxylic acid components, and 100 mole % of ethylene glycol as a glycol component; storage elastic modulus E' at 30° C.=2.3×10$^9$ Pa; hereinafter abbreviated as "hard PEs-C".

(4) Soft Polyester Series Resin A: a copolyester formed of 54 mole % of terephthalic acid and 46 mole % of sebacic acid as dicarboxylic acid components, and 100 mole % of ethylene glycol as a glycol component; storage elastic modulus E' at 30° C.=1.8×10$^7$ Pa; hereinafter abbreviated as "soft PEs-A".

(5) Copolyester 1: product name "SKYGREEN PETG S2008" (produced by SK Chemicals Co., Ltd.); hereinafter abbreviated as "Pes(1)".

(6) Copolyester 2: product name "Embrace LV" (produced by Eastman Chemical Company); hereinafter abbreviated as "Pes(2)".

(Polystyrene Series Resin)

(1) Polystyrene Series Resin A: a styrene-butadiene block copolymer; styrene/butadiene=82/18 (mass %); storage elastic modulus E' at 30° C.=2.1×10$^9$ Pa; loss elastic modulus E"

peak temperature=75° C.; loss elastic modulus E" thereat=1.4×10⁸ Pa; hereinafter abbreviated as "SBS-A".

(2) Polystyrene Series Resin B: a styrene-butadiene block copolymer; styrene/butadiene=83/17 (mass %); storage elastic modulus E' at 30° C.=2.1×10⁹ Pa; loss elastic modulus E" peak temperature=74° C.; loss elastic modulus E" thereat=2.9×10⁸ Pa; hereinafter abbreviated as "SBS-B".

(3) Polystyrene Series Resin C: a styrene-butadiene block copolymer; styrene/butadiene=82/18 (mass %); storage elastic modulus E' at 30° C.=2.1×10⁹ Pa; loss elastic modulus E" peak temperature=73° C.; loss elastic modulus E" thereat=2.4×10⁸ Pa; hereinafter abbreviated as "SBS-C".

(4) Hard Polystyrene Series Resin A: a styrene-butadiene block copolymer; styrene/butadiene=76/24 (mass %); storage elastic modulus E' at 30° C.=1.7×10⁹ Pa; loss elastic modulus E" peak temperature=100° C.; hereinafter abbreviated as "hard St-A".

(5) Hard Polystyrene Series Resin B: a styrene-butadiene block copolymer; styrene/butadiene=78/22 (mass %); storage elastic modulus E' at 30° C.=8.9×10⁸ Pa; loss elastic modulus E" peak temperature=100° C.; hereinafter abbreviated as "hard St-B".

(6) Hard Polystyrene Series Resin C: a hydrogenated product of a styrene-ethylene-butylene block copolymer; a styrene unit content of 50 mass %; storage elastic modulus E' at 30° C.=6.8×10⁸ Pa; loss elastic modulus E" peak temperature=112° C.; hereinafter abbreviated as "hard St-C".

(7) Soft Polystyrene Series Resin A: a styrene-butadiene block copolymer; styrene/butadiene=71/29 (mass %); storage elastic modulus E' at 30° C.=2.1×10⁸ Pa; loss elastic modulus E" peak temperature=100° C.; hereinafter abbreviated as "soft St-A".

(8) Soft Polystyrene Series Resin B: a hydrogenated product of a styrene-isoprene block copolymer; a styrene unit content of mass %; storage elastic modulus E' at 30° C.=5.1×10⁶ Pa; loss elastic modulus E" peak temperature=-8° C.; hereinafter abbreviated as "soft St-B".

(9) Styrene-Butadiene Copolymer 1: a styrene-butadiene copolymer having: styrene/butadiene=90/10 (mass %); storage elastic modulus E' (0° C.)=3.15×10⁹ Pa; and a peak temperature of a loss elastic modulus E" at 55° C.; hereinafter referred to as "PS(1)".

(10) Styrene-Butadiene Copolymer 2: product name "DK-11" (produced by Chevron Phillips Chemical Company); hereinafter referred to as "PS(2)".

(11) Styrene-Butadiene Copolymer 3: product name "Asaflex 830" (produced by Asahi Kasei Chemicals Corporation); hereinafter referred to as "PS(3)".

(Compatibilizer)
(1) Compatibilizer A: an ethylene/glycidyl methacrylate-styrene graft copolymer; hereinafter abbreviated as "compatibilizer-A".
(2) Compatibilizer B: an amine modified styrene-ethylene/butylene-styrene block copolymer; hereinafter abbreviated as "compatibilizer-B".
(3) Compatibilizer C: an oxazoline group-containing polystyrene; hereinafter abbreviated as "compatibilizer-C".
(4) Compatibilizer D: a polybutylene terephthalate-polytetramethylene copolymer mixture; hereinafter abbreviated as "compatibilizer-D".
(5) Oxazoline Group-Containing Styrene Series Copolymer: product name "EPOCROS RPS-1005 (produced by Nippon Shokubai Co. Ltd.); hereinafter abbreviated as "comp (1)".
(6) Styrene-Maleic Anhydride Copolymer: product name "Dylark 232" (produced by NOVA Chemicals); hereinafter abbreviated as "comp (2)".
(7) Polyester Series Elastomer: product name "PRIMALLOY A1700" (produced by Mitsubishi Chemical Corporation); hereinafter abbreviated as "comp (3)".
(8) Modified Styrene Series Elastomer: product name "Dynalon 8630P" (produced by JSR Corporation); hereinafter abbreviated as "comp (4)".
(9) (Ethylene-Glycidyl Methacrylate)-Polystyrene Graft Copolymer: product name "Modiper A4100" (produced by NOF CORPORATION Chemical Division); hereinafter abbreviated as "comp (5)".

Example 1-1

The SBS-A was used in the (C) layer, and the hard PEs-A was used in the (A) layer. Additionally, a mixed resin composition of 70 mass % of the hard PEs-C and 30 mass % of the soft St-B was kneaded into a pellet by a biaxial extruder, and the pellet was used in the (B) layer.

Three monoaxial extruders manufactured by MITSUBISHI HEAVY INDUSTRIES, LTD. were used to melt-mix these resins respectively, at a set temperature of 210° C. to 240° C.; and these resins were co-extruded therefrom such that a thickness of each layer was (the (A) layer)/(the (B) layer)/(the (C) layer)/(the (B) layer)/(the (A) layer)=40 μm/20 μm/130 μm/20 μm/40 μm, by means of a five-layer die having three kinds of layers. Then, the laminate was drawn by a castroll at 60° C., and then cooled and solidified to obtain a non-elongated laminated sheet of 300 mm in width and 250 μm in thickness. Subsequently, a film tentering machine manufactured by KYOTO MACHINERY CO., LTD. was used to elongate the laminated sheet by 5.0 times in a crosswise monoaxial direction at a preheating temperature of 93° C. and an elongation temperature of 87° C. to 90° C.; and thereafter the laminated sheet was heat-treated at 63° C. Thereby, a heat-shrinkable film in a thickness of 50 μm was obtained.

Next, this heat-shrinkable film was cut to have a width of 235 mm in TD. Then, a bag-making machine was used to: overlap portions of 10 mm at both ends of the film in TD with each other; seal 5 mm in width of the edges of the film by using a solvent (tetrahydrofuran/cyclohexane=75/25 in volume fraction (hereinafter referred to as a "solvent 1")); and thereby make a cylindrical film. This cylindrical film was cut to have 110 mm in MD, fitted around a square-shaped PET bottle having a capacity of 350 ml, and dipped in hot water of 99° C. for 10 seconds.

This heat-shrinkable film did not show peeling between the (A) layer and the (B) layer, and peeling between the (B) layer and the (C) layer even after the boil treatment, did not show misalignment between the layers in the sealed portion, and maintained an excellent appearance. Further, a shrinkage ratio of this heat-shrinkable film at 80° C. in the TD direction was 46%. These confirmed that the heat-shrinkable film of Example 1 can be employed as a heat-shrinkable label.

Example 1-2

A pellet obtained by mixing and kneading, by a biaxial extruder, the hard PEs-C (65 mass %), the soft St-B (30 mass %), and the compatibilizer-B (5 mass %) being a compatibilizer for the (B) layer was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-3

A pellet obtained by mixing and kneading the hard PEs-A (55 mass %), the hard St-A (40 mass %) and the compatibilizer-B (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-4

A pellet obtained by mixing and kneading the hard PEs-B (27.5 mass %), the soft PEs-A (27.5 mass %), the hard St-A (40 mass %), and the compatibilizer-A (5 mass %) by a biaxial extruder, was used as a resin in the (B) layer. Except for that, a heat-shrinkable film was obtained in the same manner as in Example 1-1.

This heat-shrinkable film was heat-treated at 99° C. as in Example 1-1. The result was that: the film did not show peeling between the (A) layer and the (B) layer, and peeling between the (B) layer and the (C) layer; a misalignment width between the layers in the sealed portion was 5% of the overlapping portion; and the film maintained an excellent appearance. Further, a shrinkage ratio of this heat-shrinkable film at 80° C. in the TD direction was 47%. These confirmed that the heat-shrinkable film of the present Example can be employed as a heat-shrinkable label.

Example 1-5

A pellet obtained by mixing and kneading the hard PEs-B (55 mass %), the hard St-A (40 mass %), and the compatibilizer-A (5 mass %) by a biaxial extrude was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-6

A pellet obtained by mixing and kneading the hard PEs-B (55 mass %), the hard St-A (40 mass %), and the compatibilizer-C (5 mass %) by a biaxial extrude was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable laminated film at 80° C. in the TD direction was 49%. These confirmed that the heat-shrinkable laminated film of the present Example can be employed as a heat-shrinkable label.

Example 1-7

A pellet obtained by mixing and kneading the hard PEs-B (55 mass %) and the soft St-A (45 mass %) by a biaxial extrude was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 52%. These confirmed that the heat-shrinkable film of the present Example can be employed as a heat-shrinkable label.

Example 1-8

A pellet obtained by mixing and kneading the hard PEs-B (55 mass %), the soft St-A (35 mass %), and the compatibilizer-C (10 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-9

A pellet obtained by mixing and kneading the hard PEs-B (55 mass %), the soft St-A (35 mass %) and the compatibilizer-D (10 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-10

A pellet obtained by mixing and kneading the hard PEs-B (45 mass %), the hard St-A (50 mass %) and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable laminated film at 80° C. in the TD direction was 50%. These confirmed that the heat-shrinkable laminated film of the present Example can be employed as a heat-shrinkable label.

Example 1-11

A pellet obtained by mixing and kneading the hard PEs-B (65 mass %), the hard St-A (30 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 49%. These confirmed that the heat-shrinkable film of the present Example can be employed as a heat-shrinkable label.

Example 1-12

A pellet obtained by mixing and kneading the hard PEs-B (45 mass %), the hard St-B (50 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable laminated film at 80° C. in the TD direction was 50%. These confirmed that the heat-shrinkable laminated film of the present Example can be employed as a heat-shrinkable label.

Example 1-13

A pellet obtained by mixing and kneading the hard PEs-B (65 mass %), the hard St-B (30 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-14

A pellet obtained by mixing and kneading the hard PEs-B (45 mass %), the soft St-A (50 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-15

A pellet obtained by mixing and kneading the hard PEs-B (65 mass %), the soft St-A (30 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable laminated film at 80° C. in the TD direction was 50%. These confirmed that the heat-shrinkable laminated film of the present Example can be employed as a heat-shrinkable label.

Example 1-16

A pellet obtained by mixing and kneading the hard PEs-B (55 mass %), the soft St-A (40 mass %), and the compatibilizer-C (5 mass %) by a biaxial extruder was used as a resin in the (B) layer. Except for that, a heat-shrinkable film was obtained in the same manner as in Example 1-1.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-17

The SBS-C was used as a resin in the (C) layer. Except for that, a heat-shrinkable film was obtained in the same manner as in Example 1-16.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 56%. These confirmed that the heat-shrinkable film of the present Example can be employed as a heat-shrinkable label.

Example 1-18

The SBS-B was used as a resin in the (C) layer. Except for that, a heat-shrinkable film was obtained in the same manner as in Example 1-16.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 50%. These confirmed that the heat-shrinkable film of the present Example can be employed as a heat-shrinkable label.

Example 1-19

The hard PEs-C was used as a resin in the (A) layer. Except for that, a heat-shrinkable film was obtained in the same manner as in Example 1-18.

This heat-shrinkable film was heat-treated at 99° C. as in Example 1-1. The result was that it did not show peeling between the (A) layer and the (B) layer, and peeling between the (B) layer and the (C) layer, did not show misalignment between the layers in the sealed portion, and maintained an excellent appearance. Further, a shrinkage ratio of this heat-shrinkable film at 80° C. in the TD direction was 53%. These confirmed that the heat-shrinkable film of the present Example can be employed as a heat-shrinkable label.

Comparative Example 1-1

A pellet obtained by mixing and kneading the soft PEs-A (65 mass %), the hard St-C (30 mass %), and the compatibilizer-A (5 mass %) by a biaxial extruder was used as a resin in the (B) layer. Except for that, a heat-shrinkable film was obtained in the same manner as in Example 1-1.

This heat-shrinkable film was heat-treated at 99° C. in the same manner as in Example 1-1. As a result, phenomena were seen that: there was misalignment between the end faces of the (A) layer and the (C) layer; further the (A) layer and the (C) layer started to be peeled apart; and the (C) layer, as well as the (B) layer and the (A) layer disposed on an outer side of the (C) layer rolled up.

Comparative Example 1-2

A pellet obtained by mixing and kneading the soft PEs-A (60 mass %), the hard St-C (35 mass %), and the compatibilizer-A (5 mass %) by a biaxial extruder was used as a resin in the (B) layer. Except for that, a heat-shrinkable film was obtained in the same manner as in Example 1-1.

This heat-shrinkable film was heat-treated at 99° C. in the same manner as in Example 1-1. As a result, phenomena were seen that: there was misalignment between the end faces of the (A) layer and the (C) layer, the end faces being applied with a solvent; further, the (A) layer and the (C) layer started to be peeled apart; and the (C) layer, as well as the (B) layer and the (A) layer disposed on an outer side of the (C) layer rolled up.

Evaluation results of the films of the Examples 1-1 to 1-19 and the Comparative Examples of 1-1 and 1-2 are shown in Table 1.

TABLE 1

| | | | Examples | | | | | | | | | | | |
|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 |
| (A) (Mass %) Layer | Polyester Series Resin | Hard PEs-A | 100 | 100 | 100 | 100 | 100 | 100 | 100 | 100 | 100 | 100 | 100 |
| | | Hard PEs-C | — | — | — | — | — | — | — | — | — | — | — |
| (B) (Mass %) Layer | Polyester Series Resin | Hard PEs-A | — | — | 55 | — | — | — | — | — | — | — | — |
| | | Hard PEs-B | — | — | — | 27.5 | 55 | 55 | 55 | 55 | 55 | 45 | 65 |
| | | Hard PEs-C | 70 | 65 | — | — | — | — | — | — | — | — | — |
| | | Soft PEs-A | — | — | — | 27.5 | — | — | — | — | — | — | — |
| | Polystyrene Series Resin | Hard St-A | — | — | 40 | 40 | 40 | 40 | — | — | — | 50 | 30 |
| | | Hard St-B | — | — | — | — | — | — | — | — | — | — | — |
| | | Hard St-C | — | — | — | — | — | — | — | — | — | — | — |
| | | Soft St-A | — | — | — | — | — | — | 45 | 35 | 35 | — | — |
| | | Soft St-B | 30 | 30 | — | — | — | — | — | — | — | — | — |
| | Compatibilizer | Compatibilizer-A | — | — | — | 5 | 5 | — | — | — | — | — | — |
| | | Compatibilizer-B | — | 5 | 5 | — | — | — | — | — | — | — | — |
| | | Compatibilizer-C | — | — | — | — | — | 5 | — | 10 | — | 5 | 5 |
| | | Compatibilizer-D | — | — | — | — | — | — | — | — | 10 | — | — |
| (C) (Mass %) layer | Polystyrene Series Resin | SBS-A | 100 | 100 | 100 | 100 | 100 | 100 | 100 | 100 | 100 | 100 | 100 |
| | | SBS-B | — | — | — | — | — | — | — | — | — | — | — |
| | | SBS-C | — | — | — | — | — | — | — | — | — | — | — |
| Heat Shrinkage Ratio % | 70° C. | TD | 20 | 21 | 22 | 13 | 15 | 17 | 18 | 18 | 18 | 18 | 16 |
| | | MD | −2 | −3 | −2 | 0 | −1 | −1.5 | −1 | −2 | −2 | −2 | −1 |
| | 80° C. | TD | 46 | 50 | 50 | 47 | 50 | 49 | 52 | 50 | 50 | 50 | 49 |
| | | MD | −6 | −7 | −5 | −4 | −4 | −3.5 | −5 | −4 | −3 | −4 | −4 |
| | Misalignment Width (%) | | 0 | 0 | 0 | 5 | 0 | 0 | 0 | 0 | 0 | 0 | 0 |
| | Evaluation Regarding Peeling | | Excellent | Excellent | Excellent | Good | Excellent | Excellent | Excellent | Excellent | Excellent | Excellent | Excellent |

| | | | Examples | | | | | | | | Comparative Examples | |
|---|---|---|---|---|---|---|---|---|---|---|---|---|
| | | | 1-12 | 1-13 | 1-14 | 1-15 | 1-16 | 1-17 | 1-18 | 1-19 | 1-1 | 1-2 |
| (A) (Mass %) Layer | Polyester Series Resin | Hard PEs-A | 100 | 100 | 100 | 100 | 100 | 100 | 100 | — | 100 | 100 |
| | | Hard PEs-C | — | — | — | — | — | — | — | 100 | — | — |
| (B) (Mass %) Layer | Polyester Series Resin | Hard PEs-A | — | — | — | — | — | — | — | — | — | — |
| | | Hard PEs-B | 45 | 65 | 45 | 65 | 55 | 55 | 55 | 55 | — | — |
| | | Hard PEs-C | — | — | — | — | — | — | — | — | — | — |
| | | Soft PEs-A | — | — | — | — | — | — | — | — | 65 | 60 |

TABLE 1-continued

|  |  |  | 1 | 2 | 3 | 4 | 5 | 6 | 7 | 8 | 9 | 10 |
|---|---|---|---|---|---|---|---|---|---|---|---|---|
|  | Polystyrene Series Resin | Hard St-A | — | — | — | — | — | — | — | — | — | — |
|  |  | Hard St-B | 50 | 30 | — | — | — | — | — | — | — | — |
|  |  | Hard St-C | — | — | — | — | — | — | — | — | 30 | 35 |
|  |  | Soft St-A | — | — | 50 | 30 | 40 | 40 | 40 | 40 | — | — |
|  |  | Soft St-B | — | — | — | — | — | — | — | — | — | — |
|  | Compatibilizer | Compatibilizer-A | — | — | — | — | — | — | — | — | 5 | 5 |
|  |  | Compatibilizer-B | — | — | — | — | — | — | — | — | — | — |
|  |  | Compatibilizer-C | 5 | 5 | 5 | 5 | 5 | 5 | 5 | 5 | — | — |
|  |  | Compatibilizer-D | — | — | — | — | — | — | — | — | — | — |
| (C) (Mass %) layer | Polystyrene Series Resin | SBS-A | 100 | 100 | 100 | 100 | 100 | — | — | — | 100 | 100 |
|  |  | SBS-B | — | — | — | — | — | — | 100 | 100 | — | — |
|  |  | SBS-C | — | — | — | — | — | 100 | — | — | — | — |
| Heat Shrinkage Ratio % | 70° C. | TD | 18 | 18 | 18 | 18 | 19 | 16 | 13 | 22 | 16 | 19 |
|  |  | MD | −2 | −2 | −2 | −2 | −2 | 1 | −1 | −1 | −1 | −1 |
|  | 80° C. | TD | 50 | 50 | 50 | 50 | 50 | 56 | 50 | 53 | 50 | 51 |
|  |  | MD | −5 | −4 | −4 | −4 | −4 | −4 | −3 | −3 | −5 | −5 |
|  | Misalignment Width (%) |  | 0 | 0 | 0 | 0 | 0 | 0 | 0 | 0 | 10~20 | 50~100 |
|  | Evaluation Regarding Peeling |  | Excellent | Excellent | Excellent | Excellent | Excellent | Excellent | Excellent | Excellent | Poor | Poor |

In making a film of the second aspect of the present invention, resin compositions to be used in the (B) layer and in the (C) layer were prepared into the form of a pellet in advance by: mixing the constituents of the (B) layer and the constituents of the (C) layer resins respectively as given in each Example and each Comparative Example shown in Table 2; feeding the mixtures respectively into a biaxial extruder (manufactured by MITSUBISHI HEAVY INDUSTRIES, LTD.); melt-mixing them at a set temperature of 210° C.; extruding them by using a strand die with a set temperature of 210° C.; and thereafter cutting, by using a strand cutter, the resin compositions having been cooled in a water tank to pelletize each of the resin compositions. The pellets obtained in the above method described above were used as resin compositions in the (B) layer and in the (C) layer in Examples and Comparative Examples shown below.

Example 2-1

In a facility enabling laminate co-extrusion of (the (A) layer/(the (B) layer)/(the (C) layer)/(the (B) layer)/(the (A) layer) by means of three monoaxial extruders (manufactured by MITSUBISHI HEAVY INDUSTRIES, LTD.) and a multimanifold extruding gate having five layers with three kinds, the polyester series resin "Pes (1)" was fed into a monoaxial extruder to form the (A) layer; a mixed resin composition (Pes (1):60 mass %; PS (2): mass %) formed into a pellet in advance was fed into a monoaxial extruder to form the (B) layer; and a mixed resin composition (Pes (1): 5 mass %; PS (1): 38 mass %; and PS (2): 57 mass %) formed into a pellet in advance was fed into a monoaxial extruder to form the (C) layer. After the above resins were melt-mixed at a set temperature of 210° C. of each of the extruders, they were co-extruded such that a thickness of each layer was (the (A) layer)/(the (B) layer)/(the (C) layer)/(the (B) layer)/(the (A) layer)=25 μm/5 μm/140 μm/5 μm/25 μm. Then, the laminate was drawn by a castroll of 60° C., and was cooled and solidified. Thereby, a non-elongated laminated sheet of 200 mm in width and 200 μm in thickness was obtained. Thereafter, a film tentering machine manufactured by KYOTO MACHINERY CO., LTD. was used to elongate the laminated sheet by 5.0 times in a crosswise monoaxial direction at a preheating temperature of 93° C. and an elongation temperature of 90° C.; and thereafter the laminated sheet was heat-treated at 63° C. Thereby, a heat-shrinkable film having a thickness of 40 μm was obtained. Evaluation results of the films obtained are shown in Table 2.

Example 2-2

As shown in Table 2, a mixed resin composition of Pes (2) (55 mass %) and PS (3) (45 mass %) formed into a pellet in advance was used in the (B) layer; and a mixed resin composition of Pes (2) (5 mass %), PS (1) (35 mass %), PS (2) (55 mass %), and comp (1) (5 mass %) formed into a pellet in advance was used in the (C) layer. Except for that, a heat-shrinkable film was obtained in the same manner as in Example 2-1. Evaluation results of the obtained film are shown in Table 2.

Example 2-3

As shown in Table 2, a mixed resin composition of Pes (2) (55 mass %), PS (3) (40 mass %), and comp (1) (5 mass %) formed into a pellet in advance was used in the (B) layer; and a mixed resin composition of Pes (2) (5 mass %), PS (1) (35 mass %), PS (2) (55 mass %), and comp (1) (5 mass %) formed into a pellet in advance was used in the (C) layer. Except for that, a heat-shrinkable film was obtained in the same manner as in Example 2-1. Evaluation results of the obtained film are shown in Table 2.

Example 2-4

As shown in Table 2, a mixed resin composition of Pes (2) (65 mass %), PS (3) (30 mass %), and comp (2) (5 mass %) formed into a pellet in advance was used in the (B) layer; and a mixed resin composition of Pes (1) (25 mass %), PS (1) (30 mass %), and PS (2) (45 mass %) formed into a pellet in advance was used in the (C) layer. Except for that, a heat-shrinkable film was obtained in the same manner as in Example 2-1. Evaluation results of the obtained film are shown in Table 2.

Example 2-5

As shown in Table 2, a mixed resin composition of Pes (2) (45 mass %), PS (3) (35 mass %), and comp (3) (20 mass %) formed into a pellet in advance was used in the (B) layer; and a mixed resin composition of Pes (1) (10 mass %), PS (1) (35 mass %), and PS (2) (55 mass %) formed into a pellet in advance was used in the (C) layer. Except for that, a heat-shrinkable film was obtained in the same manner as in Example 2-1. Evaluation results of the obtained film are shown in Table 2.

Example 2-6

As shown in Table 2, a mixed resin composition of Pes (2) (55 mass %), PS (1) (40 mass %), and comp (4) (5 mass %) formed into a pellet in advance was used in the (B) layer; and a mixed resin composition of Pes (2) (5 mass %), PS (1) (35 mass %), PS (2) (55 mass %), and comp (1) (5 mass %) formed into a pellet in advance was used in the (C) layer. Except for that, a heat-shrinkable film was obtained in the same manner as in Example 2-1. Evaluation results of the obtained film are shown in Table 2.

Example 2-7

As shown in Table 2, a mixed resin composition of Pes (2) (55 mass %), PS (1) (40 mass %), and comp (5) (5 mass %) formed into a pellet in advance was used in the (B) layer; and a mixed resin composition of Pes (2) (5 mass %), PS (1) (35 mass %), PS (2) (55 mass %), and comp (1) (5 mass %) formed into a pellet in advance was used in the (C) layer. Except for that, a heat-shrinkable film was obtained in the same manner as in Example 2-1. Evaluation results of the obtained film are shown in Table 2.

Example 2-8

As shown in Table 2, a mixed resin composition of Pes (2) (55 mass %), PS (3) (35 mass %), and comp (1) (10 mass %) formed into a pellet in advance was used in the (B) layer; and a mixed resin composition of Pes (1) (10 mass %), PS (1) (35 mass %), and PS (2) (55 mass %) formed into a pellet in advance was used in the (C) layer. Except for that, a heat-shrinkable film was obtained in the same manner as in Example 2-1. Evaluation results of the obtained film are shown in Table 2.

Example 2-9

As shown in Table 2, a mixed resin composition of Pes (2) (55 mass %), PS (3) (40 mass %), and comp (1) (5 mass %) formed into a pellet in advance was used in the (B) layer; and a mixed resin composition of Pes (1) (15 mass %), PS (1) (35 mass %), and PS (2) (50 mass %) formed into a pellet in advance was used in the (C) layer. Except for that, a heat-shrinkable film was obtained in the same manner as in Example 2-1. Evaluation results of the obtained film are shown in Table 2.

Example 2-10

As shown in Table 2, a mixed resin composition of Pes (2) (55 mass %), PS (3) (40 mass %), and comp (1) (5 mass %) formed into a pellet in advance was used in the (B) layer; and a mixed resin composition of Pes (1) (35 mass %), PS (1) (25 mass %), and PS (2) (40 mass %) formed into a pellet in advance was used in the (C) layer. Except for that, a heat-shrinkable film was obtained in the same manner as in Example 2-1. Evaluation results of the obtained film are shown in Table 2.

Comparative Example 2-1

In a facility enabling laminate co-extrusion of (the (A) layer/(the (B) layer)/(the (C) layer)/(the (B) layer)/(the (A) layer) by means of three monoaxial extruders (manufactured by MITSUBISHI HEAVY INDUSTRIES, LTD.) and a multimanifold extruding gate having five layers with three kinds, the polyester series resin "Pes (1)" was fed into a monoaxial extruder to form the (A) layer; a monoaxial extruder to form the (B) layer was stopped; and a mixed resin composition (Pes (2):5 mass %; PS (1): 35 mass %; PS (2): 55 mass %; comp (1): 5 mass %) formed into a pellet in advance was fed into a monoaxial extruder to form the (C) layer. After the above resins were melt-mixed at a set temperature of 210° C. of each of the extruders, they were co-extruded such that a thickness of each layer was (the (A) layer)/(the (C) layer)//(the (A) layer)=25 μm/150 μm/25 μm. Then, the laminate was drawn by a castroll of 60° C., and was cooled and solidified. Thereby, a non-elongated laminated sheet of 200 mm in width and 200 μm in thickness was obtained. Thereafter, a film tentering machine manufactured by KYOTO MACHINERY CO., LTD. was used to elongate the laminated sheet by 5.0 times in a crosswise monoaxial direction at a preheating temperature of 93° C. and an elongation temperature of 90° C.; and thereafter the laminated sheet was heat-treated at 63° C. Thereby, a heat-shrinkable film having a thickness of 40 μm was obtained. Evaluation results of the films obtained are shown in Table 2.

Comparative Example 2-2

As shown in Table 2, the comp (3) was used in the (B) layer (the resin composition used in the (B) layer in Comparative Example 2-2 was a commercially available pellet, not a resin composition pelletized in advance by a biaxial extruder; and a mixed resin composition of Pes (1) (10 mass %), PS (1) (35 mass %), and PS (2) (55 mass %) formed into a pellet in advance was used in the (C) layer. Except for that, a heat-shrinkable film was obtained in the same manner as in Example 2-1. Evaluation results of the obtained film are shown in Table 2.

Comparative Example 2-3

As shown in Table 2, a mixed resin composition of Pes (2) (15 mass %), PS (3) (80 mass %), and comp (1) (5 mass %) formed into a pellet in advance was used in the (B) layer; and a mixed resin composition of Pes (1) (35 mass %), PS (1) (25 mass %), and PS (2) (40 mass %) formed into a pellet in advance was used in the (C) layer. Except for that, a heat-shrinkable film was obtained in the same manner as in Example 2-1. Evaluation results of the obtained film are shown in Table 2.

TABLE 2

| | | | Examples | | | | | | |
| --- | --- | --- | --- | --- | --- | --- | --- | --- | --- |
| | | | 2-1 | 2-2 | 2-3 | 2-4 | 2-5 | 2-6 | 2-7 |
| (A) Layer | Polyester Series Resin | Pes (1) | 100 | 100 | 100 | 100 | 100 | 100 | 100 |

TABLE 2-continued

|  |  |  |  |  |  |  |  |  |
|---|---|---|---|---|---|---|---|---|
| (B) Layer | Polyester Series Resin | Pes (1) | 60 | — | — | — | — | — | — |
|  |  | Pes (2) | — | 55 | 55 | 65 | 45 | 55 | 55 |
|  | Polystyrene Series Resin | PS (1) | — | — | — | — | — | 40 | 40 |
|  |  | PS (2) | 40 | — | — | — | — | — | — |
|  |  | PS (3) | — | 45 | 40 | 30 | 35 | — | — |
|  | Compatibilizer | comp (1) | — | — | 5 | — | — | — | — |
|  |  | comp (2) | — | — | — | 5 | — | — | — |
|  |  | comp (3) | — | — | — | — | 20 | — | — |
|  |  | comp (4) | — | — | — | — | — | 5 | — |
|  |  | comp (5) | — | — | — | — | — | — | 5 |
| (C) Layer | Polyester Series Resin | Pes (1) | 5 | — | — | 25 | 10 | — | — |
|  |  | Pes (2) | — | 5 | 5 | — | — | 5 | 5 |
|  | Polystyrene Series Resin | PS (1) | 38 | 35 | 35 | 30 | 35 | 35 | 35 |
|  |  | PS (2) | 57 | 55 | 55 | 45 | 55 | 55 | 55 |
|  | Compatibilizer | comp (1) | — | 5 | 5 | — | — | 5 | 5 |
| Heat Shrinkage Ratio (%) at 80° C. for 10 sec. (TD) |  |  | 47 | 47 | 47 | 47 | 46 | 47 | 46 |
| Interlayer Peeling Strength (N/15 mm) |  |  | 1.6 Good | 1.6 Good | 2.0 Excellent | 2.1 Excellent | 1.9 Good | 1.7 Good | 1.3 Good |
| Haze Value (%) |  |  | 3.3 Excellent | 3.2 Excellent | 3.4 Excellent | 5.3 Good | 3.5 Excellent | 3.1 Excellent | 4.4 Excellent |
| Evalution Regarding Delamination in High-Temperature Treatment |  |  | Excellent | Excellent | Excellent | Excellent | Good | Excellent | Excellent |
| Evalution Regarding Whitening On Bending |  |  | Good | Good | Good | Good | Good | Good | Good |
| Overall Evaluation |  |  | Good | Good | Excellent | Good | Good | Good | Good |

|  |  |  | Examples | | | Comparative Examples | | |
|---|---|---|---|---|---|---|---|---|
|  |  |  | 2-8 | 2-9 | 2-10 | 2-1 | 2-2 | 2-3 |
| (A) Layer | Polyester Series Resin | Pes (1) | 100 | 100 | 100 | 100 | 100 | 100 |
| (B) Layer | Polyester Series Resin | Pes (1) | — | — | — | — | — | — |
|  |  | Pes (2) | 55 | 55 | 55 | — | — | 15 |
|  | Polystyrene Series Resin | PS (1) | — | — | — | — | — | — |
|  |  | PS (2) | — | — | — | — | — | — |
|  |  | PS (3) | 35 | 40 | 40 | — | — | 80 |
|  | Compatibilizer | comp (1) | 10 | 5 | 5 | — | — | 5 |
|  |  | comp (2) | — | — | — | — | — | — |
|  |  | comp (3) | — | — | — | — | 100 | — |
|  |  | comp (4) | — | — | — | — | — | — |
|  |  | comp (5) | — | — | — | — | — | — |
| (C) Layer | Polyester Series Resin | Pes (1) | 10 | 15 | 35 | — | 10 | 35 |
|  |  | Pes (2) | — | — | — | 5 | — | — |
|  | Polystyrene Series Resin | PS (1) | 35 | 35 | 25 | 35 | 35 | 25 |
|  |  | PS (2) | 55 | 50 | 40 | 55 | 55 | 40 |
|  | Compatibilizer | comp (1) | — | — | — | 5 | — | — |
| Heat Shrinkage Ratio (%) at 80° C. for 10 sec. (TD) |  |  | 47 | 47 | 47 | 51 | 46 | 46 |
| Interlayer Peeling Strength (N/15 mm) |  |  | 2.1 Excellent | 1.9 Good | 1.7 Good | 0.6 Poor | 3.2 Excellent | 0.6 Poor |
| Haze Value (%) |  |  | 3.2 Excellent | 4.3 Excellent | 6.3 Good | 3.0 Excellent | 6.0 Good | 6.5 Good |
| Evalution Regarding Delamination in High-Temperature Treatment |  |  | Excellent | Excellent | Excellent | Excellent | Poor | Excellent |
| Evalution Regarding Whitening On Bending |  |  | Good | Good | Good | Good | Poor | Good |
| Overall Evaluation |  |  | Excellent | Good | Good | Average | Poor | Average |

It can be seen from Table 2 that the films of the second aspect of the present invention (Examples 2-1 to 2-10) are heat-shrinkable films having sufficient interlayer peeling strength, compared with the films in a three-layer structure having two kinds of layers without having the (B) layer.

Further, it is made clear that when the content of the polyester series resin in the (A) layer, the (B) layer, and the (C) layer was outside the range specified in the second aspect of the present invention (Comparative Example 2-3), the adhesion strength between the (A) layer and the (B) layer degraded drastically, resulting in inability to meet the properties required for the heat-shrinkable film.

Furthermore, comparison among Examples 2-1 to 2-10, for example comparison of Examples 2-2 and 2-3 demonstrates that when the compatibilizer specified in the second aspect of the present invention is added to the resin composition constituting the (B) layer, an advantageous effect of improving the interlayer peeling strength can be provided. Moreover, it is found that using the compatibilizer specified in the second aspect of the present invention enables the film to successfully function as a heat-shrinkable film, without having negative effects on the transparency or the delamination of the film in a high-temperature treatment.

Additionally, when the polyester series elastomer was used in the (B) layer in order to improve the interlayer peeling strength (Comparative Example 2-2), peeling was seen in the evaluation of delamination under a high-temperature treatment, and whitening of the film occurred when the film was bent.

On the other hand, such whitening on bending was not seen in Examples 2-1 to 2-10, which demonstrates that the films in the Examples can have a better design.

INDUSTRIAL APPLICABILITY

The film of the present invention is excellent in heat shrinkability, transparency, and interlayer adhesiveness at room temperature, and is not easily peeled even under a high-temperature treatment. Further, it can be favorably used as a heat-shrinkable laminated film which is inhibited from being whitened when bent, namely whitening on bending, and is suitable for such uses as shrinkage packaging, shrink-bond packaging, and a shrinkable label. It can also be favorably employed to make a molded product having the heat-shrinkable laminated film, especially a shrink label.

The invention has been described above as to the embodiment which is supposed to be practical as well as preferable at present. However, it should be understood that the invention is not limited to the embodiment disclosed in the specification and can be appropriately modified within the range that does not depart from the gist or spirit of the invention, which can be read from the appended claims and the overall specification, and a heat-shrinkable laminated film, a molded product, a heat-shrinkable label, and a container fitted with this molded product or this label, with such modifications are also encompassed within the technical range of the invention.

DESCRIPTION OF THE REFERENCE NUMERALS 100 film piece
2 (A) layer (front layer)
2' (A) layer (back layer)
4 (B) layer (adhesive layer)
6 (C) layer (middle layer)
8 overlapping portion
8w overlapping width
10 edge of the (A) layer (front layer)
10' edge of the (A) layer (back layer)
12 edge of the (B) layer (adhesive layer)
14 edge of the (C) layer (middle layer)
16 sealed portion
18 misalignment
18w misalignment width
A one end side
B the other end side

The invention claimed is:

1. A heat-shrinkable laminated film, comprising:
a first A layer;
a first B layer placed on the first A layer;
a C layer placed on the first B layer;
a second B layer placed on the C layer; and
a second A layer placed on the second B layer, wherein
the first and second A layers have a resin composition comprising a polyester resin as a main component,
the first and second B layers have a resin composition comprising a combination of a polyester resin and a polystyrene resin as a main component, where the polyester resin in the first and second B layers is a hard polyester resin or a mixture of a hard polyester resin and a soft polyester resin, the polyester resin in the first and second B layers is different from the polyester resin in the first and second A layers, and the polystyrene resin in the first and second B layers is a soft polystyrene resin, a hard polystyrene resin, or a mixture thereof,
the hard polyester resin has a storage elastic modulus (E') of $3.00 \times 10^8$ Pa or more, the soft polyester resin has an E' value of less than $3.00 \times 10^8$ Pa, the hard polystyrene resin has an E' value of $4.00 \times 10^8$ Pa or more, and the soft polystyrene resin has an E' value of less than $4.00 \times 10^8$ Pa, under conditions of an oscillation frequency of 10 Hz, a distortion of 0.1%, and a temperature of 30° C.,
the C layer comprises a resin composition comprising a polystyrene resin as a main component,
a mass ratio of the polyester resin in the first and second B layers to the polystyrene resin in the first and second B layers is from 90/10 to 30/70, and
when the heat-shrinkable laminated film is cut to obtain a rectangle film piece having a size of 110 mm in a drawing direction MD and 235 mm in a direction TD orthogonal to the drawing direction MD, the rectangle film piece having a first end side and a second end side extending parallel to the drawing direction MD of the rectangle film piece,
a portion of the first A layer on the first end side of the rectangle film piece is placed on a portion of the second A layer on the second end side of the rectangle film piece to form an overlapping portion parallel to the drawing direction MD,
the overlapping portion is sealed by applying a solvent to form a cylindrical film such that the overlapping portion has a width of 2 to 7 mm, and
the cylindrical film is wrapped around a square-shaped polyethylene terephthalate bottle having a capacity of 350 ml, dipped in hot water of 99° C. for 10 seconds, and then returned to room temperature,
a misalignment width between an edge of the first A layer in the first end side and an edge of the C layer in the first end side, or a misalignment width between edges of the first A layer and the first B layer in the first end side and the edge of the C layer in the first end side is not more than 5% of the width of the overlapping portion.

2. The heat-shrinkable laminated film of claim 1, wherein the polyester resin in the first and second A layers comprises a component derived from terephthalic acid as a dicarboxylic acid component, and a component derived from ethylene glycol and 1,4-cyclohexanedimethanol as a diol component.

3. The heat-shrinkable laminated film of claim 1, wherein the polystyrene resin in the C layer comprises a copolymer of a styrene hydrocarbon and a conjugated diene hydrocarbon.

4. The heat-shrinkable laminated film of claim 1, wherein each of the first and second B layers further comprises a compatibilizer that facilitates compatibility between the polyester resin in the first and second A layers or the first and second B layers, and the polystyrene resin in the first and second B layers or the C layer.

5. The heat-shrinkable laminated film of claim 1, wherein the C layer further comprises a polyester resin and a compatibilizer that facilitates compatibility between the polyester resin in the C layer and the polystyrene resin in the C layer.

6. The heat-shrinkable laminated film of claim 1, wherein the heat-shrinkable laminated film has a heat shrinkage ratio of 20% or more in at least one direction when dipped in hot water of 80° C. for 10 seconds.

7. A molded product, comprising:
a base material comprising the heat-shrinkable laminated film of claim 1.

8. A heat-shrinkable label, comprising:
a base material comprising the heat-shrinkable laminated film of claim 1.

9. A container, comprising:
the molded product of claim 7.

10. A container, comprising:
the heat-shrinkable label of claim 8.

11. The heat-shrinkable laminated film of claim 1, wherein the hard polyester resin in the first and second B layers is at least one selected from the group consisting of polyethylene terephthalate, polyethylene naphthalate, polybutylene terephthalate, and a polyester formed from terephthalic acid and 1,4-cyclohexanedimethanol; a copolymer thereof; and a copolyester comprising at least one of isophthalic acid, ethylene glycol, polyalkylene glycol, and 1,4-cyclohexanedimethanol as a copolymerization component.

12. The heat-shrinkable laminated film of claim 1, wherein the hard polyester resin has a storage elastic modulus (E') of $4.00 \times 10^8$ Pa or more under the conditions of an oscillation frequency of 10 Hz, a distortion of 0.1%, and a temperature of 30° C.

13. The heat-shrinkable laminated film of claim 1, wherein the hard polyester resin has a storage elastic modulus (E') of $5.00 \times 10^8$ Pa or more under the conditions of an oscillation frequency of 10 Hz, a distortion of 0.1%, and a temperature of 30° C.

14. The heat-shrinkable laminated film of claim 1, wherein a ratio of a thickness of the C layer to a thickness of the first or the second A layer is from 2 to 6.

15. The heat-shrinkable laminated film of claim 1, wherein a thickness of each of the first and second B layers is from 10 to 100% of a total thickness of the first and second A layers.

16. The heat-shrinkable laminated film of claim 1,
wherein a ratio of a thickness of the C layer to a thickness of the first or the second A layer is from 2 to 6, and
a thickness of each of the first and second B layers is from 10 to 100% of a total thickness of the first and second A layers.

17. The heat-shrinkable laminated film of claim 1, wherein the polyester resin in the first and second B layers consists of the hard polyester resin.

18. The heat-shrinkable laminated film of claim 1, wherein a mass ratio of the polyester resin to the polystyrene resin in the first and second B layers is from 80/20 to 40/60.

19. The heat-shrinkable laminated film of claim 4, wherein a mass ratio of the polyester resin to the polystyrene resin in the first and second B layers is from 80/20 to 40/60.

20. The heat-shrinkable laminated film of claim 16, wherein a mass ratio of the polyester resin to the polystyrene resin in the first and second B layers is from 80/20 to 40/60.

* * * * *